US011476958B2

(12) United States Patent
Tsuboi et al.

(10) Patent No.: US 11,476,958 B2
(45) Date of Patent: Oct. 18, 2022

(54) INTERFERENCE EVALUATION DEVICE, EVALUATION METHOD AND EVALUATION PROGRAM

(71) Applicant: NIPPON TELEGRAPH AND TELEPHONE CORPORATION, Tokyo (JP)

(72) Inventors: Hideyuki Tsuboi, Musashino (JP); Kota Ito, Musashino (JP); Yutaka Imaizumi, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 128 days.

(21) Appl. No.: 16/981,739

(22) PCT Filed: Mar. 11, 2019

(86) PCT No.: PCT/JP2019/009801
§ 371 (c)(1),
(2) Date: Sep. 17, 2020

(87) PCT Pub. No.: WO2019/181621
PCT Pub. Date: Sep. 26, 2019

(65) Prior Publication Data
US 2021/0306085 A1    Sep. 30, 2021

(30) Foreign Application Priority Data
Mar. 22, 2018 (JP) ............................. JP2018-055323

(51) Int. Cl.
*H04B 17/345* (2015.01)
*H04W 28/02* (2009.01)
(Continued)

(52) U.S. Cl.
CPC ...... *H04B 17/345* (2015.01); *H04W 28/0236* (2013.01); *H04W 72/082* (2013.01); *H04W 16/18* (2013.01)

(58) Field of Classification Search
CPC .. H04B 17/345; H04B 17/3912; H04B 17/26; H04W 28/0236; H04W 72/082; H04W 16/18
See application file for complete search history.

(56) References Cited

U.S. PATENT DOCUMENTS 10,368,321 B1 * 7/2019 Sitaram ............... H04B 7/0686
2012/0051315 A1 * 3/2012 Wang ................. H04W 72/082
370/329

(Continued)

FOREIGN PATENT DOCUMENTS

JP    2001318888 A    11/2001
JP    201326884 A     2/2013
(Continued)

*Primary Examiner* — Pao Sinkantarakorn
*Assistant Examiner* — Kabir U Jahangir

(57) ABSTRACT

To provide an interference evaluation apparatus including a station information storage unit configured to store interfering station information indicating station information related to an interfering station causing radio interference in radio communication and interfered station information indicating station information related to an interfered station receiving the interference, and a determination unit configured to perform an interference calculation for calculating an interference power, based on the interfering station information and the interfered station information stored in the station information storage unit, and determine whether the interfering station and the interfered station are usable together, based on the calculated interference power and an acceptable interference power in the interfered station.

18 Claims, 25 Drawing Sheets

(51) Int. Cl.
*H04W 72/08* (2009.01)
*H04W 16/18* (2009.01)

(56) References Cited

U.S. PATENT DOCUMENTS

| | | | |
|---|---|---|---|
| 2014/0226504 A1* | 8/2014 | Tavildar | H04W 72/1226 370/252 |
| 2015/0245361 A1* | 8/2015 | Hughes | H04W 72/082 455/450 |
| 2016/0128001 A1* | 5/2016 | Tsuda | H04W 52/243 370/329 |
| 2018/0220428 A1* | 8/2018 | Sun | H04W 74/008 |
| 2021/0037392 A1* | 2/2021 | Furuichi | H04W 72/082 |

FOREIGN PATENT DOCUMENTS

| | | | |
|---|---|---|---|
| JP | 5500630 B2 | 5/2014 | |
| JP | 5699545 B2 | 4/2015 | |
| JP | 201769780 A | 4/2017 | |

\* cited by examiner

| MENU | SUB-MENU | FUNCTIONAL OVERVIEW |
|---|---|---|
| INTERFERENCE EXAMINATION | MAP | INTERFERENCE EVALUATION IN WHICH SPECIFIC LOCATIONS OF INTERFERING STATION OR INTERFERING SOURCE CAUSING INTERFERENCE AND INTERFERED STATION RECEIVING INFLUENCE OF INTERFERENCE ARE DESIGNATED FOR CONDITION SETTING OF INTERFERENCE CALCULATION |
| | MODEL | INTERFERENCE EVALUATION IN WHICH MODEL CONDITION SUCH AS DISTANCE BETWEEN INTERFERING STATION AND INTERFERED STATION AND RELATIVE ANGLE OF ANTENNA DIRECTION IS DESIGNATED FOR CONDITION SETTING OF INTERFERENCE CALCULATION IF LOCATION OF INTERFERING STATION AND LOCATION OF INTERFERED STATION ARE AMBIGUOUS |
| SIMPLIFIED BASE-STATION EXAMINATION | SIMPLIFIED BASE-STATION EXAMINATION | INTERFEROMETRIC EVALUATION FOR CALCULATING AREA WITH INTERFERENCE INFLUENCE AND AREA WITH NO INTERFERENCE INFLUENCE IF LOCATION OF EITHER OF INTERFERING STATION OR INTERFERED STATION IS IDENTIFIED |
| INTERMODULATION EXAMINATION | SELECTION PROHIBITED FREQUENCY SELECTION | <OMITTED> |
| | DISTURBANCE WAVE LEVEL EXAMINATION | <OMITTED> |
| MANAGEMENT TOOL | STATION DB MANAGEMENT | MANAGE (E.G., ADD, EDIT OR UTILIZE IN INTERFERENCE CALCULATION), IN STATION DB, STATION INFORMATION OF INTERFERING STATION OR INTERFERED STATION SUBJECT TO INTERFERENCE EVALUATION |

Fig. 4

STATION DB MANAGEMENT

NARROWING CONDITION
FREQUENCY BAND: 2 GHz
SYSTEM NAME:
- ☐ SYSTEM_21
- ☐ SYSTEM_22
- ☑ SYSTEM_23
- ☑ SYSTEM_24
- ☐ SYSTEM_25

APPARATUS TYPE:
STATION NAME:
CENTER FREQUENCY: [ ] ~ [ ] GHz

[DISPLAY]

| STATION NAME | LATITUDE 1 | LONGITUDE 1 | LATITUDE 2 | LONGITUDE 2 | SYSTEM NAME | CENTER FREQUENCY |
|---|---|---|---|---|---|---|
| STATION 2 | 35.65.XX | 139.89.XX | 35.73.XX | 139.94.XX | SYSTEM_23 | 2.24XX MHz |
| STATION 3 | 35.81.XX | 139.90.XX | 35.38.XX | 139.87.XX | SYSTEM_24 | 2.24XX MHz |
| STATION 4 | 35.73.XX | 139.94.XX | 35.65.XX | 139.89.XX | SYSTEM_23 | 2.24XX MHz |
| STATION 1 | 35.39.XX | 139.58.XX | 35.52.XX | 139.91.XX | SYSTEM_24 | 2.24XX MHz |

[ADD] [MODIFY] [DELETE] [CLOSE]

| EXECUTION CONDITION DESIGNATION (MAP) | | | | | | |
|---|---|---|---|---|---|---|
| CALCULATION METHOD: ● POINT CALCULATION  ○ PLANE CALCULATION | | | | | [SELECT HISTORY] [CLEAR INPUT] | |

INFORMATION OF INTERFERING STATION AND INTERFERED STATION

STATION SPECS REGISTERED [SELECT FOR INTERFERING STATION] [SELECT FOR INTERFERED STATION]

| INTERFERING/ INTERFERED | STATION NAME | LATITUDE 1 | LONGITUDE 1 | LATITUDE 2 | LONGITUDE 2 | SYSTEM NAME | ANTENNA NAME |
|---|---|---|---|---|---|---|---|
| INTERFERING | STATION 2 | 35.65X | 139.84X | --- | --- | SYSTEM_S2 | B |
| INTERFERING | STATION 3 | 35.58X | 139.74X | --- | --- | SYSTEM_S2 | B |
| INTERFERING | STATION 4 | 35.46X | 139.62X | --- | --- | SYSTEM_S2 | A |
| INTERFERED | STATION 1 | 35.39X | 139.58X | --- | --- | SYSTEM_S1 | A |

[NEWLY ADD] [MODIFY] [DELETE]

CALCULATION LEVEL DESIGNATION  ☐ CONSIDER ATTENUATION DUE TO TOMOGRAPHIC FEATURES  ☑ CONSIDER ATTENUATION DUE TO BUILDINGS

☑ CONSIDER ADDITIONAL LOSSES ( XXXXXX dB)  [SQUARE ROOT LAW + RIDGE LOSS ▼]

[PRIMARILY SAVE] [EXECUTE CALCULATION] [CLOSE]

| INTERFERING/INTERFERED | STATION NAME | LATITUDE 1 | LONGITUDE 1 | LATITUDE 2 | LONGITUDE 2 | SYSTEM NAME | ANTENNA NAME |
|---|---|---|---|---|---|---|---|
| INTERFERING | STATION 2 | 35.65X | 139.84X | — | — | SYSTEM_S2 | B |
| INTERFERING | STATION 3 | 35.58X | 139.74X | — | — | SYSTEM_S2 | B |
| INTERFERED | STATION 4 | 35.46X | 139.62X | — | — | SYSTEM_S2 | A |
| INTERFERED | STATION 1 | 35.39X | 139.58X | — | — | SYSTEM_S1 | A |

EXECUTION CONDITION DESIGNATION (MAP)

CALCULATION METHOD: ○ POINT CALCULATION  ● PLANE CALCULATION

INFORMATION OF INTERFERING STATION AND INTERFERED STATION

STATION SPECS REGISTERED: [SELECT INTERFERING STATION] [SELECT FOR INTERFERED STATION]  [SELECT HISTORY] [CLEAR INPUT]

| INTERFERING/ INTERFERED | STATION NAME | LATITUDE 1 | LONGITUDE 1 | LATITUDE 2 | LONGITUDE 2 | SYSTEM NAME | ANTENNA NAME |
|---|---|---|---|---|---|---|---|
| INTERFERING | STATION 2 | 35.65X | 139.84X | --- | --- | SYSTEM 52 | B |
| INTERFERING | STATION 3 | 35.58X | 139.74X | --- | --- | SYSTEM 52 | B |
| INTERFERED | STATION 4 | 35.46X | 139.62X | --- | --- | SYSTEM 52 | A |
| INTERFERED | STATION 1 | 35.39X | 139.58X | --- | --- | SYSTEM 51 | A |

[NEWLY ADD] [MODIFY] [DELETE]

INTERFERENCE EXAMINATION SPECS
RECEPTION GROUND HEIGHT [ ] [✓] MINIMUM RECEPTION SENSITIVITY [ ] [✓] LOWEST DISTURBANCE WAVE [ ]
NUMBER OF STATIONS SIMULTANEOUSLY TRANSMITTING [ ] STATIONS

AREA DESIGNATION
[SELECT AREA DESIGNATION FILE] UPPER LEFT COORDINATES LATITUDE [xxxxx] LATITUDE [xxxxx]
LOWER RIGHT COORDINATES LATITUDE [xxxxx] LATITUDE [xxxxx]

INTERFERING STATION ANTENNA DIRECTION
● WORST  ○ DESIGNATE INTERFERING DIRECTION  ○ ALWAYS CONSTANT ANGLE RELATIVE TO INTERFERED STATION
(ANGLE DIFFERENCE xxxxxx DEG)

CALCULATION LEVEL DESIGNATION
CONSIDER ATTENUATION DUE [✓] TO TOMOGRAPHIC FEATURES | SQUARE ROOT ▼ | ☐ CONSIDER ATTENUATION DUE TO BUILDINGS
[✓] CONSIDER ADDITIONAL LOSSES ( xxxxxx dB) | LAW + RIDGE LOSS |

[PRIMARILY SAVE]  [EXECUTE CALCULATION]  [CLOSE]

INTERFERENCE EVALUATION DEVICE, EVALUATION METHOD AND EVALUATION PROGRAM

CROSS-REFERENCE TO RELATED APPLICATIONS

This application is a 371 U.S. National Phase of International Application No. PCT/JP2019/009801, filed on Mar. 11, 2019, which claims priority to Japanese Application No. 2018-055323 filed on Mar. 22, 2018. The entire disclosures of the above applications are incorporated herein by reference.

TECHNICAL FIELD

The present invention relates to an interference evaluation apparatus, an interference evaluation method, and an interference evaluation program.

BACKGROUND ART

In recent years, there has been a problem for tightness of frequency resources in association with the spread of various radio communication systems. To effectively utilize limited frequency resources, system designs that takes into account interference occurring between radio stations are required. Interference evaluation is performed in advance to achieve such system designs. To perform interference evaluation, interference calculation needs to be performed based on information related to radio transmission by an interfering station causing interference, information related to radio reception by an interfered station receiving the interference, and propagation losses of an interference wave that attenuates depending on the distance from the interfering station to the interfered station or other environmental conditions.

The interference evaluation as described above has traditionally been performed by a person having expertise and skills related to radio wave propagation losses, specifications of radio apparatus, and the like by using, for example, general spreadsheet software. For example, FIG. 24 is a diagram illustrating an example of an interference calculation screen utilizing general spreadsheet software. As illustrated, a plurality of parameter items used for the interference calculation are listed on the left side of the interference calculation screen. Each of the parameter items is classified into any one of five categories: "Transmission side specification", "Reception side specification", "Transmission power structure", "Propagation losses", and "Reception side power structure". These listed parameter items need to be set with appropriate values for specific individual cases of the interference evaluation.

A line design graph showing a calculation result of the interference calculation by a line graph is displayed on the right side of the interference calculation screen illustrated in FIG. 24. This line design graph is generated based on a value set for each of the parameter items listed on the left side of the interference calculation screen. As illustrated in FIG. 24, the line design graph shows power values of the transmission power calculated based on the values of the parameter items of "Interfering transmission side system", "Propagation losses/Additional losses", and "Interfered reception side system" from the left side toward the right side in this order. This represents a transmission power structure. The line design graph also shows a margin value of interference in which I/N required on interfered side is taken into account with respect to the system noise power. Thus, a deficient interference suppression amount, which is a difference value between the calculated power value of transmission power and the margin value of interference, is calculated.

In the interference calculation screen illustrated as an example in FIG. 24, the calculation result of the interference calculation indicates that the calculated power value of transmission power does not satisfy the margin value of interference. That is, an amount of acceptable interference power in the interfered station exceeds the interference influence received by the interfered station from the interfering station. As a result, it is determined that the interfering station and the interfered station cannot be simultaneously utilized (used together). Thus, in the interference calculation screen illustrated in FIG. 24, an "x" mark indicating that the interfering station and the interfered station cannot be used together is displayed in a display region of the item of "Determination results".

FIG. 25 is a diagram illustrating another example of the interference calculation screen utilizing general spreadsheet software. As illustrated, a plurality of parameter items used for the interference calculation are listed on the left side of the interference calculation screen. Each of the parameter items is classified into any one of four categories: "Transmission side specification", "Reception side specification", "Propagation losses", and "Reception side power structure". These listed parameter items need to be set with appropriate values for specific individual cases of the interference evaluation.

However, in the case of the interference calculation screen illustrated in FIG. 25, an apparatus on the transmission side indicated by the "Transmission side specification" displayed as a category is not a radio apparatus for communication but electric appliances or the like that emit unwanted waves.

In other words, FIG. 25 illustrates an interference calculation screen in a case where a line design is performed by regarding unwanted waves emitted by electric appliances or the like as an interference wave. In this example, transmission power density of the unwanted waves to be emitted is used as a parameter item of the "Transmission source specification" for the interference calculation.

As with FIG. 24, a line design graph is displayed on the right side of the interference calculation screen illustrated in FIG. 25. In the interference calculation screen illustrated as an example in FIG. 25, the calculation result of the interference calculation indicates that noise power on the transmission side is smaller than acceptable interference power on the reception side. That is, the reception side can accept influence of interference from the transmission side. As a result, it is determined that the interfering station and the interfered station cannot be simultaneously utilized (used together). Thus, in the interference calculation screen illustrated in FIG. 25, an "o" mark indicating that the interfering station and the interfered station can be used together is displayed in a display region of the item of "Determination results".

Examples of a specific conventional technique for performing an interference calculation include the technique disclosed in Patent Literature 1 for performing interference evaluation on a transmission station and a reception station on the ground, and the technique disclosed in Patent Literature 2 for performing interference evaluation on a satellite and a radio device on the ground.

CITATION LIST

Patent Literature

Patent Literature 1: JP 5699545 B1
Patent Literature 2: JP 5500630 B1
Patent Literature 2: JP 2013-26884 A

SUMMARY OF THE INVENTION

Technical Problem

However, when the interference evaluation is performed by a conventional technique, as described above, expertise and know-how are required for radio wave propagation losses, the specification of the radio apparatus, and the like. In addition, a method of the interference calculation is different depending on a subject of the interference evaluation. Thus, for each subject of the interference evaluation, the expertise and the know-how are needed based on the past experience to properly determine a value of the parameters in the interference calculation. Through the interference calculation based on the value of the parameters, whether or not a radio station to be subjected to the interference evaluation is acceptable is determined. From the foregoing, it has been difficult for a person not having the expertise or the know-how to perform the interference evaluation.

In light of the above, an object of the present invention is to provide an interference evaluation apparatus capable of further facilitating interference calculation, an interference evaluation method therefor, and an interference evaluation program therefor.

Means for Solving the Problem

One aspect of the present invention is an interference evaluation apparatus which includes a station information storage unit configured to store interfering station information indicating station information related to an interfering station causing radio interference in radio communication and interfered station information indicating station information related to an interfered station receiving the interference, and a determination unit configured to perform an interference calculation for calculating an interference power, based on the interfering station information and the interfered station information stored in the station information storage unit, and determine whether the interfering station and the interfered station are usable together, based on the calculated interference power and an acceptable interference power in the interfered station.

In addition, one aspect of the present invention is the interference evaluation apparatus described above, the apparatus further including a history storage unit configured to store history information indicating a calculation condition used in the previously performed interference calculation, in which the determination unit performs the interference calculation, based on the history information stored in the history storage unit.

One aspect of the present invention is the interference evaluation apparatus described above, the apparatus further including a station information selection unit configured to generate a list of the interfering station information and the interfered station information stored in the station information storage unit and configured to receive information indicating an instruction for selecting at least one of the interfering station information and the interfered station information used in the interference calculation from the list, in which the station information selection unit receives information indicating an instruction for narrowing the list, based on a designated range of a center frequency or a frequency band.

One aspect of the present invention is the interference evaluation apparatus described above, the apparatus further including an interferometry selection unit configured to receive information indicating an instruction for selecting a first interference calculation indicating an interference calculation performed by using at least one of information indicating a location of the interfering station and information indicating a location of the interfered station and a second interference calculation indicating an interference calculation performed by not using the information indicating the location of the interfering station and the location of the interfered station.

In addition, one aspect of the present invention is the interference evaluation apparatus described above, the apparatus further including a diagram display unit configured to display, by way of a map or in a profile view, the information indicating the interference calculation performed by the determination unit.

In addition, one aspect of the present invention is the interference evaluation apparatus described above, in which the determination unit performs an interference calculation, based on information of a plurality of interfering stations and information of one interfered station to determine whether the plurality of interfering stations and the interfered station are usable together.

In addition, one aspect of the present invention is an interference evaluation method, the method including storing interfering station information indicating station information related to an interfering station causing radio interference in line communication and interfered station information indicating station information related to an interfered station receiving the interference, and a determination step of performing an interference calculation for calculating an interference power, based on the interfering station information and the interfered station information stored in storing the station information, and determining whether the interfering station and the interfered station are usable together, based on the calculated interference power and an acceptable interference power in the interfered station.

An aspect of the present invention is a computer program for causing a computer to function as the interference evaluation apparatus described above.

Effects of the Invention

The present invention facilitates interference calculations.

BRIEF DESCRIPTION OF DRAWINGS

FIG. 4 is a functional list for explaining functions of menus displayed on the main menu screen generated by the interference evaluation apparatus 1 according to the embodiment of the present invention.

FIG. 5 is a schematic view illustrating an example of a station DB management screen displayed by the interference evaluation apparatus 1 according to the embodiment of the present invention.

FIG. 6 is a schematic view illustrating an example of a station DB editing screen displayed by the interference evaluation apparatus 1 according to the embodiment of the present invention.

FIG. 8 is a schematic view illustrating an example of an execution condition designation screen in map-based interference evaluation displayed by the interference evaluation apparatus 1 according to the embodiment of the present invention.

FIG. 9 is a schematic view illustrating an example of a history selection screen in the map-based interference evaluation displayed by the interference evaluation apparatus 1 according to the embodiment of the present invention.

FIG. 10 is a schematic view illustrating an example of a station selection screen displayed by the interference evaluation apparatus 1 according to the embodiment of the present invention.

FIG. 11 is a schematic view illustrating an example of an execution condition designation screen displayed by the interference evaluation apparatus 1 according to the embodiment of the present invention.

FIG. 12 is a schematic view illustrating an example of an execution condition designation screen displayed by the interference evaluation apparatus 1 according to the embodiment of the present invention.

FIG. 13 is a schematic view illustrating an example of an execution condition designation screen displayed by the interference evaluation apparatus 1 according to the embodiment of the present invention.

FIG. 18 is a schematic view illustrating an example of a calculation result display screen displayed by the interference evaluation apparatus 1 according to the embodiment of the present invention.

DESCRIPTION OF EMBODIMENTS

Embodiments

An interference evaluation apparatus 1 according to an embodiment of the present invention will be described below with reference to the drawings.

Overview of Functions of Interference Evaluation Apparatus

Figure 1:
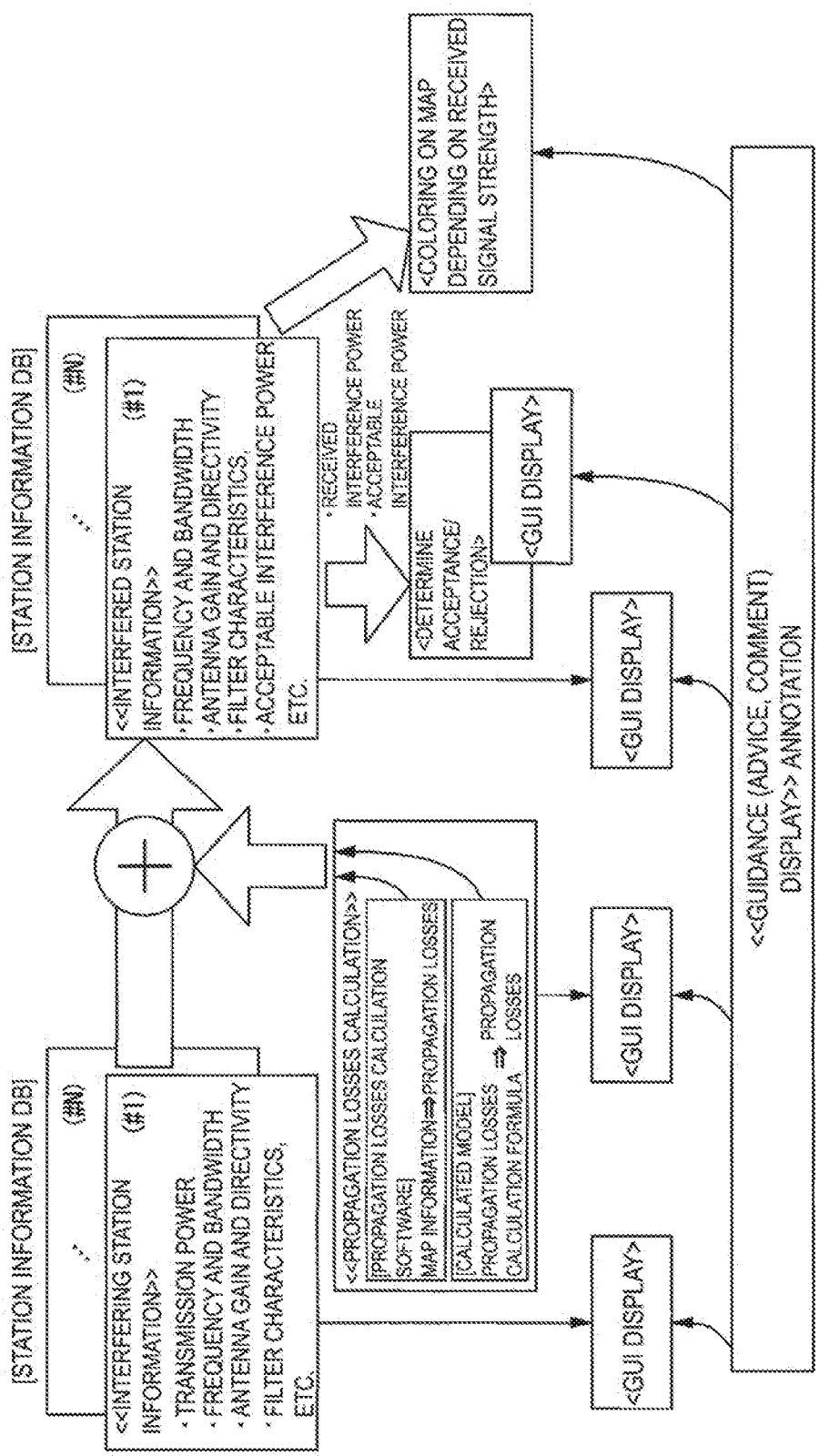
FIG. 1 is a schematic diagram illustrating an overview of functions of an interference evaluation apparatus 1 according to an embodiment of the present invention.

An overview of functions of the interference evaluation apparatus 1 will be described below. FIG. 1 is a schematic diagram illustrating the overview of functions of the interference evaluation apparatus 1 according to the embodiment of the present invention.

A main function of the interference evaluation apparatus 1 is a station DB management function of storing and managing a plurality of pieces of interfering station information and a plurality of pieces of interfered station information in a database (hereinafter referred to as "DB"). The interfering station information includes information indicating transmission power, frequency and bandwidth, antenna gain and filter characteristics, and the like. The interfered station information includes information indicating frequency and bandwidth, antenna gain and filter characteristics, acceptable interference power, and the like.

Another main function of the interference evaluation apparatus 1 is a propagation losses calculation function of calculating propagation losses based on the interfering station information and the interfered station information by using propagation losses computation software or a calculation model. The propagation losses software is software using map information to calculate propagation losses. The calculation model is a model for calculating propagation losses from a propagation losses calculation formula.

Another function of the interference evaluation apparatus 1 includes an acceptance/rejection determination function of determining, based on a calculation result by the propagation losses calculation function, whether or not the interfering station and the interfered station is usable together, or a received signal strength output function of outputting information indicating received signal strength computed based on a calculation result by the propagation losses calculation function.

Another function of the interference evaluation apparatus 1 is a Graphical User Interface (GUI) display function of displaying a display screen visually representing information utilized or generated by each of the above-described functions. In a display screen, which is displayed by the GUI display function, for selecting the interfering station information and the interfered station information, desired interfering station information and desired interfered station information are each displayed to be selectable from among the interfering station information and the interfered station information which are made into DB by the station information DB management function. The propagation losses calculation function utilizes the selected interfering station information and interfered station information for propagation losses calculation.

Note that, as illustrated in FIG. 1, in each of display screens displayed by the GUI display function, there may be a guidance (advice, comments) display function of displaying guidance (or advice or comments) to a user. The guidance (or advice or comments) is displayed, for example, in the form of annotations (notes).

Functional Configuration of Interference Evaluation Apparatus

Figure 2:
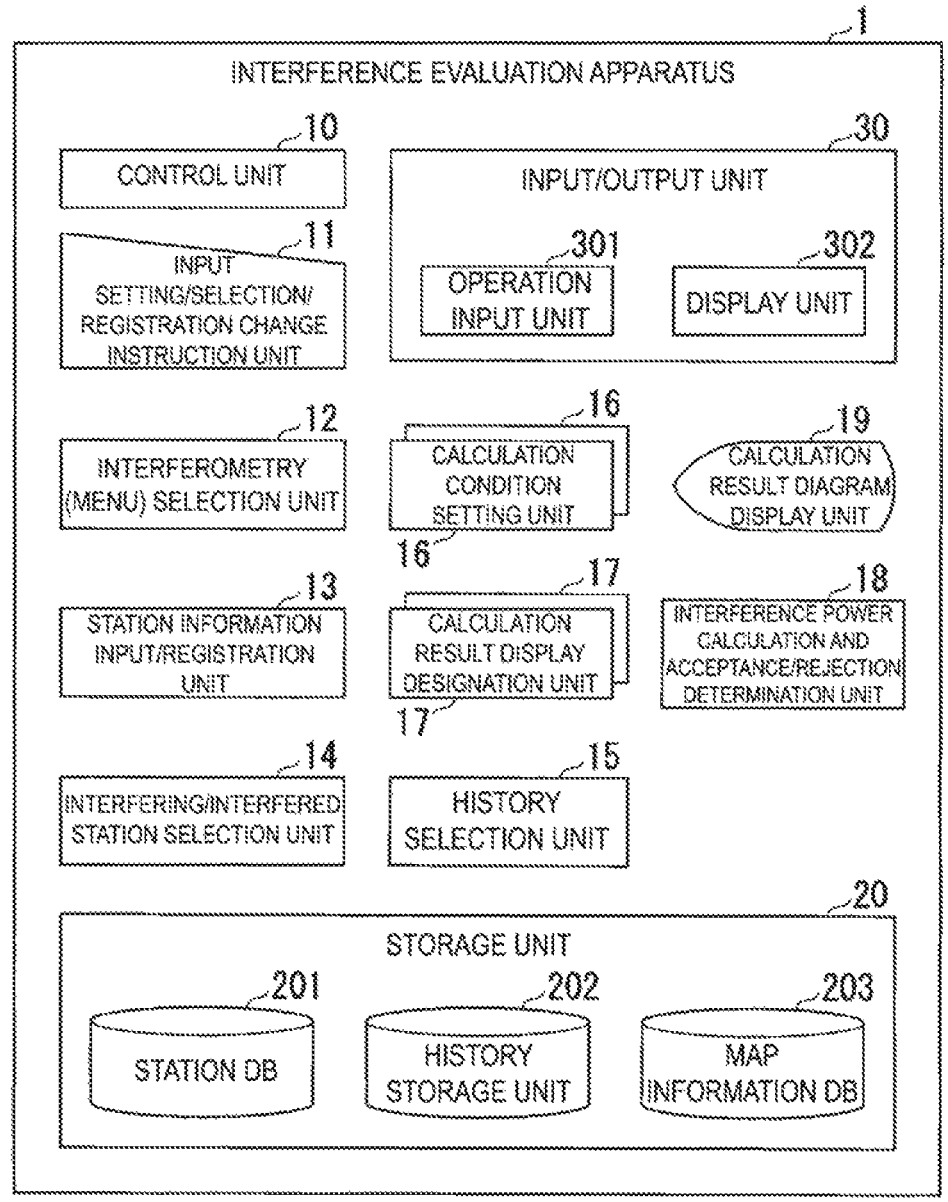
FIG. 2 is a block diagram illustrating a functional configuration of the interference evaluation apparatus 1 according to the embodiment of the present embodiment.

FIG. 2 is a block diagram illustrating a functional configuration of the interference evaluation apparatus 1 according to an embodiment of the present embodiment. As illustrated in FIG. 2, the interference evaluation apparatus 1 includes a control unit 10, an input setting/selection/registration change instruction unit 11, an interferometry (menu) selection unit 12, a station information input/registration unit 13, an interfering/interfered station selection unit 14, a history selection unit 15, at least one calculation condition setting unit 16, at least one calculation result display designation unit 17, an interference power calculation and acceptance/rejection determination unit 18, a calculation result diagram display unit 19, a storage unit 20, and an input/output unit 30.

The interference evaluation apparatus 1 includes an information processing apparatus (for example, a general-purpose computer such as a personal computer or a small information terminal such as a tablet terminal).

The control unit 10 controls processing executed by each of the functional blocks of the interference evaluation apparatus 1. The control unit 10 includes a processor (for example, a Central Processing Unit (CPU)).

As illustrated in FIG. 2, the storage unit 20 includes a station DB 201, a history storage unit 202, and a map information DB 203. The storage unit 20 includes a storage medium (for example, a magnetic disk, a semiconductor memory, or a combination of these storage mediums).

As illustrated in FIG. 2, the input/output unit 30 includes an operation input unit 301 and a display unit 302.

The operation input unit 301 includes an input member (for example, a keyboard, or a mouse) that accepts an operation input by a user. The display unit 302 includes an output member (for example, a liquid crystal display) that displays a display screen presented to a user. Note that the operation input unit 301 and the display unit 302 may be constituted by one member (for example, a touch panel) having an input/output function.

Note that the input setting/selection/registration change instruction unit 11, the interferometry (menu) selection unit 12, the station information input/registration unit 13, the interfering/interfered station selection unit 14, the history selection unit 15, the at least one calculation condition setting unit 16, the at least one calculation result display designation unit 17, the interference power calculation and acceptance/rejection determination unit 18, and the calculation result diagram display unit 19 may be a function implemented by a software program executed by the control unit 10. In this case, for example, the software program is stored in the storage unit 20, and is read out and executed by the control unit 10.

The input setting/selection/registration change instruction unit 11 acquires information input through the operation input unit 301 by a user operation input. The input setting/selection/registration change instruction unit 11 converts the operation input into an instruction indicating an input setting, selection, registration changes, or the like that is recognizable by each of the functional blocks of the interference evaluation apparatus 1, and then outputs the instruction to each of the function blocks. Specifically, the input setting/selection/registration change instruction unit 11 converts an electrical signal input from the operation input unit 301 into input data to be input to a software program constituting each of the functional blocks of the interference evaluation apparatus 1, for example.

The map information DB 203 is database that stores map information. The map information referred here is information indicating existing objects (such as a building, a road, or a river) and the altitude for each location (such as latitude and longitude), for example. The map information DB 203 is used to display a location of a radio station to be subjected to the interference evaluation, an interference evaluation result, or the like, onto a map.

The calculation result display designation unit 17 designates how to display the calculation result in the interference evaluation and the like onto a map displayed on the display unit 302, based on instruction information input from the operation input unit 301, indicating an instruction from a user.

The calculation result diagram display unit 19 displays an evaluation result of the interference evaluation onto a map displayed on the display unit 302, based on the designation by the calculation result display designation unit 17.

The history storage unit 202 accumulates information (hereinafter also referred to as "history information") indicating a calculation condition and an evaluation result in the interference evaluation with respect to a radio station that has been subjected to the interference evaluation in the past. The history information stored in the history storage unit 202 is utilized in new interference evaluations.

The history selection unit 15 designates how to select and utilize the history information accumulated in the history storage unit 202, based on instruction information input from the operation input unit 301, indicating an instruction from a user.

The station DB 201 (station information storage unit) is a database composed of information related to a radio station to be subjected to the interference evaluation.

The interfering/interfered station selection unit 14 (station information selection unit) selects, based on instruction information input from the operation input unit 301 indicating an instruction from a user, information related to a radio station stored in the station DB 201 to utilize the information for the interference evaluation.

The station information input/registration unit 13 inputs and registers the information related to a radio station to the station DB 201, based on instruction information input from the operation input unit 301, indicating an instruction from a user.

The interferometry (menu) selection unit 12 determines what type of interference evaluation is to be performed, based on instruction information input from the operation input unit 301, indicating an instruction from a user.

The calculation condition setting unit 16 sets a calculation condition of the interference evaluation in the interferometry selected by the interferometry (menu) selection unit 12. The calculation condition setting unit 16 is configured to set a calculation condition of the interference evaluation by using the information related to a radio station selected by the interfering/interfered station selection unit 14.

Note that the selection of the information of a radio station and the setting of a calculation condition of the interference evaluation described above are performed via the input setting/selection/registration change instruction unit 11.

The interference power calculation and acceptance/rejection determination unit 18 performs calculation of the interference power and acceptance/rejection determination. In the interference power calculation and acceptance/rejection determination unit 18, after the selection of the information related to a radio station to be evaluated and the setting of a calculation condition of the interference evaluation are performed by the calculation condition setting unit 16, and if an instruction of executing calculation is provided via the input setting/selection/registration change instruction unit 11, then the interference power calculation and acceptance/rejection determination unit 18 executes the calculation of the interference power. The interference power calculation and acceptance/rejection determination unit 18 determines acceptance or rejection by comparing a value of the interference power based on the result of executing the calculation of the interference power and a value for which the interference is acceptable. The acceptance/rejection determination referred here is determination indicating whether or not an interfering station being a radio station to be evaluated and an interfered station receiving influence from the interfering station are usable together.

The calculation result display designation unit 17 stores, in the history storage unit 202, information indicating a calculation result of the interference evaluation output from the interference power calculation and acceptance/rejection determination unit 18, and displays the information onto the map displayed on the display unit 302, as described above.

As described above, the calculation condition setting unit 16 and the calculation result display designation unit 17 may include a plurality of the calculation condition setting units 16 and a plurality of the calculation result display designation units 17, respectively. In this case, the plurality of calculation condition setting units 16 have partially different functions from each other, and the plurality of calculation result display designation units 17 have partially different functions from each other. Each of the plurality of calculation condition setting units 16 and each of the plurality of calculation result display designation units 17 are selected and used depending on a type of the interference evaluation based on instruction information input from the operation input unit 301, indicating an instruction from a user.

A relationship between the overview of the functions of the interference evaluation apparatus 1 described with reference to FIG. 1 (hereinafter referred to as the "functional overview") and the functional configuration of the interference evaluation apparatus 1 described with reference to FIG. 2 (hereinafter referred to as the "functional configuration") will be described below.

The station DB management function of storing and managing the plurality of pieces of interfering station information and the plurality of pieces of interfered station information in the DB in the above-described functional overview corresponds to the station information input/registration unit 13 and the interfering/interfered station selection unit 14 in the above-described functional configuration.

The propagation losses calculation function of calculating propagation losses based on the interfering station information and the interfered station information by using propagation losses computation software or a calculation model in the above-described functional overview corresponds to the at least one calculation condition setting unit 16 and a part of the interference power calculation and acceptance/rejection determination unit 18 in the above-described functional configuration.

The acceptance/rejection determination function (of determining whether or not the interfering station and the interfered station are usable together, based on the calculation result by the propagation losses calculation function) in the above-described functional overview corresponds to a part of the interference power calculation and acceptance/rejection determination unit 18 and the result display function by the calculation result display designation unit 17 in the above-described functional configuration.

The received signal strength output function (of outputting information indicating received signal strength computed by the calculation result by the propagation losses calculation function) in the above-described functional overview corresponds to a part of the interference power calculation and acceptance/rejection determination unit 18 and the result display function by the calculation result display designation unit 17 in the above-described functional configuration.

Details of each of the functions of the interference evaluation apparatus 1 will be described below with reference to a screen example of the display screen generated by the GUI display function of the interference evaluation apparatus 1 described above.

Main Menu Screen

Figure 3:
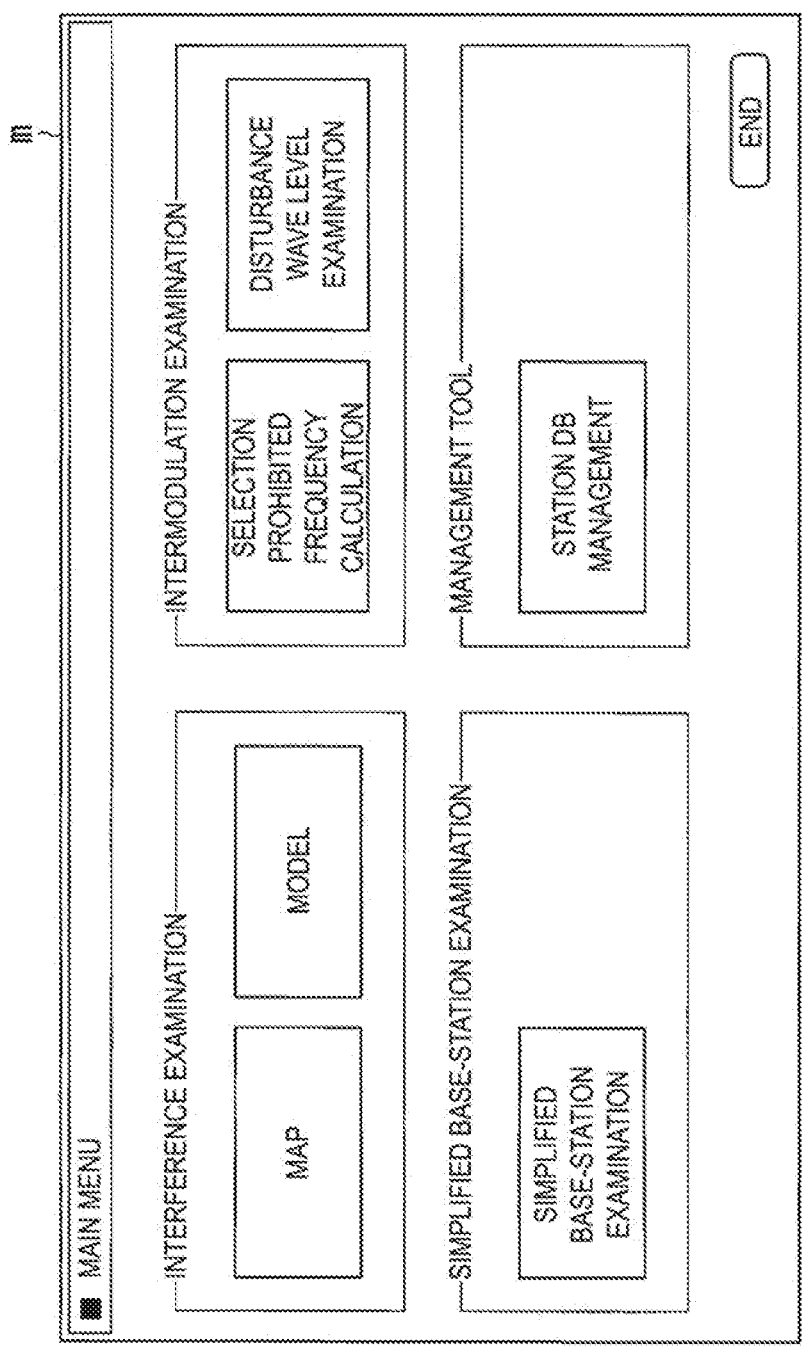
FIG. 3 is a schematic view illustrating an example of a main menu screen displayed by the interference evaluation apparatus 1 according to the embodiment of the present invention.

A main menu screen displayed on the display unit 302 will be described below. FIG. 3 is a schematic view illustrating an example of the main menu screen displayed by the interference evaluation apparatus 1 according to the embodiment of the present invention. As illustrated, four menus of "Interference examination", "Intermodulation examination", "Simplified base-station examination", and "Management tools" are displayed on a main menu screen m. Each of the menus includes a submenu.

Note that the main menu screen m is generated by the interferometry (menu) selection unit 12, and is displayed by the display unit 302. The interferometry (menu) selection unit 12 controls display of the main menu screen m by the display unit 302, based on the information input through the operation input unit 301.

As illustrated in FIG. 3, the submenu belonging to the "Interference examination" menu includes "Map" and "Model", the submenu belonging to the "Simplified base-station examination" menu includes "Simplified base-station examination", the submenu belonging to the "Intermodulation examination" menu includes "Selection prohibited frequency calculation" and "Disturbance wave level examination", and the submenu belonging to the "Management tools" menu includes "Station DB management".

Each of the submenus serves as a selection button. When any one of the submenus is selected (i.e., the selection button is depressed) by a user operation input through the operation input unit 301, the interference evaluation apparatus 1 starts various processes.

In the main menu screen m illustrated in FIG. 3, the submenus belonging to the "Interference examination", "Simplified base-station examination", and "Intermodulation examination" menus are submenus selected when a user performs the interference evaluation. These submenus are provided for selecting a type of interference calculation to be used for the interference evaluation (i.e., select a type of interference evaluation to be used).

In the main menu screen m illustrated in FIG. 3, the submenu ("Station DB management") belonging to the "Management tools" menu is a submenu selected when a user manages a setting and information related to the interference evaluation apparatus 1.

In the main menu screen m illustrated in FIG. 3, when a selection button corresponding to any one of submenus included in any one of "Interference examination", "Simplified base-station examination", and "Intermodulation examination" menus is depressed, the screen transits from the main menu screen m to an interference calculation condition setting screen for performing interference evaluation corresponding to the selected submenu.

The functions of the menus included in the main menu screen m illustrated in FIG. 3 will be described below.

FIG. 4 is a functional list for explaining functions of the menus displayed on the main menu screen generated by the interference evaluation apparatus 1 according to the embodiment of the present invention.

The "Map" which is a submenu belonging to the "Interference examination" menu is a submenu selected by a user in a case of performing interference evaluation (hereinafter referred to as "map-based interference evaluation") performed by designating, as an interference calculation condition setting, at least one of a specific location of an interfering station or an interference source causing interference or a specific location of an interfered station receiving influence of the interference.

Although details will be described below, in the map-based interference evaluation, an interference evaluation result, locations of the interfering station and the interfered station on the map, topographical information between the interfering station and the interfered station, and the like are also illustrated in a profile view.

Note that although not shown in the functional list shown in FIG. 4, the types of the map-based interference evaluation are further subdivided. Although details will be described below, the interference calculation for the map-based interference evaluation includes "Point calculation", "Plane calculation", and "Satellite and ground station calculation".

Note that the calculation condition setting unit 16 and the calculation result display designation unit 17 are provided (as illustrated in FIG. 2) for each of the types of interference calculation, such as a plurality of types of interference calculations included in the map-based interference calculation (i.e., "Point calculation", "Plane calculation", and "Satellite and ground station calculation"), and a model-based interference calculation.

The point calculation is an evaluation calculation used when both the location of the interfering station and the location of the interfered station are identified. In the map-based interference evaluation based on the point calculation, interference generated between the interfering station and the interfered station is calculated based on the identified location of the interfering station and the identified location of the interfered station. Thus, the acceptance/rejection determination is made as to whether or not the interference is acceptable. A difference value is also calculated between an acceptable amount for which the interference is acceptable in the interfered station and an interference amount in a case of receiving influence of the interference.

The plane calculation is an evaluation calculation used when either one of the location of the interfering station and the location of the interfered station is identified. In the map-based interference evaluation based on the plane calculation, the identified location of the interfering station or the identified location of the interfered station is used as a reference, and the periphery of the location is sectioned on meshes (in a net-like pattern) on the map. Then, the interference amount between the interfering station and the interfered station is computed in a case where the interfering station or the interfered station whose location is not identified is arranged on the meshes. As a result, a range in which influence of the interference occurs and a range in which interference is acceptable are displayed on the map.

The satellite and ground station calculation is an evaluation calculation used in a case where the location of the ground station is identified. In the map-based interference evaluation based on the satellite and ground station calculation, determination is made as to whether or not influence of the interference by the satellite occurs, regardless of being stationary or orbiting. If the influence of the interference by the satellite occurs, determination is made as to whether or not the influence is acceptable. Conversely, determination is also made as to whether or not the interference from the ground station (whose location is identified) affects the satellite.

The "Model" which is a submenu belonging to the "Interference examination" menu is a submenu selected by a user in a case of performing "interference evaluation (hereinafter referred to as "model-based interference evaluation") performed by designating a model condition as an interference calculation condition setting, in a case where the locations of the interfering station and the interfered station are ambiguous (or unknown)". The model condition is a designating condition based on, for example, distance between the interfering station and the interfered station, an angle in the relative antenna direction of each of the interfering station and the interfered station, and the like.

The model-based interference evaluation requires an indication showing that how long the distance between the interfering station and the interfered station should be secured (i.e., how long the separation is needed) not to receive the influence of the interference, without depending on the geographic environment in which individual radio stations are installed.

The "Simplified base-station examination" which is a submenu belonging to the "Simplified base-station examination" menu is a submenu selected by a user in a case of performing "interference evaluation performed, in a case where either one of the locations of the interfering station and the interfered station is identified, by computing an area in which influence of the interference is received (the interfering station and the interfered station are not usable together) and an area in which influence of the interference is not received (the interfering station and the interfered station are usable together)". In the interference evaluation based on the simplified base-station examination, a calculation result indicating an interference level is exhibited as a heat map on the map.

As described above, the submenu belonging to the "Intermodulation examination" menu includes "Selection prohibited frequency selection" and "Disturbance wave level examination". The intermodulation examination is an examination of a phenomenon (third harmonic wave) in which interference waves of two different frequencies f1 and f2 affect another frequency f3 (=2f1 ±f2). The description of the contents of the "Selection prohibited frequency calculation" and "Disturbance wave level examination" used in the intermodulation examination will be omitted.

As indicated in the above-described main menu screen illustrated in FIG. 3 and function list shown in FIG. 4, the interference evaluation apparatus 1 enables a user to easily select a desired method from a plurality of methods of interference evaluation, and perform an interference calculation in accordance with the selected method to perform interference evaluation.

The "Station DB management" which is a submenu belonging to the "Management tools" menu is a submenu selected by a user when "station information of the interfering station or the interfered station to be subjected to the interference evaluation is managed (for example, added, edited, or utilized in the interference calculation) in the station DB".

Station DB Management

A station DB management screen displayed on the display unit 302 will be described below. FIG. 5 is a schematic view illustrating an example of the station DB management screen displayed by the interference evaluation apparatus 1 according to the embodiment of the present invention.

A station DB management screen sm illustrated in FIG. 5 is a setting screen for managing station information of radio stations serving as an interfering station and an interfered station.

Note that the station DB management screen sm is generated by the station information input/registration unit 13, and is displayed by the display unit 302. The station information input/registration unit 13 controls display of the station DB management screen sm by the display unit 302, based on the information input through the operation input unit 301.

As illustrated in FIG. 5, there are arranged an "Add" button for registering new station information to the station DB 201, a "Modify" button for modifying the contents of the station information already stored in the station DB 201, and a "Delete" button for deleting the station information stored in the station DB 201, on the station DB management screen sm.

As illustrated in FIG. 5, a list of station information is displayed on the lower part of the station DB management screen sm. The station information displayed in this list includes station information matching to a narrowing condition by items such as "Frequency band" and "Station name" displayed in a "Narrowing conditions" field on the top of the station DB management screen sm.

With at least one piece of station information being selected from the station information displayed in the list of station information, if the "Modify" button or the "Delete" button is depressed, the station information stored in the station DB 201 is modified or deleted.

For example, in the station DB management screen sm illustrated in FIG. 5, if a "Show" button is depressed with "2 GHz" being selected in a pull-down menu of the "Frequency band", a list of system names is displayed in a "System name" field. In FIG. 5, "System_21", "System_22", "System_23", "System_24", and "System_25" are displayed.

Here, if the "Show" button is depressed with two check boxes of "System_24" and "System_23" being selected, a list of station information of radio stations corresponding to either one of "System_24" and "System_23" is displayed on the lower part of the station DB management screen sm.

As illustrated in FIG. 5, the list of station information displays "Station name" of each of the radio stations, information ("Latitude" and "Longitude") indicating a location at which each of the radio stations is installed, information ("Latitude 2" and "Longitude 2") indicating a location of a radio station opposing each of the radio stations, "System name" used in each of the radio stations, "Center frequency" in radio communication by the system, and the like.

Note that it is important in the interference evaluation to narrow the candidates of the radio stations to be subjected to the interference evaluation by "Frequency band" and "Center frequency". This is because interference in radio systems occurs between systems using the same frequency band or between systems whose center frequencies are close to one another.

In the station DB management screen sm illustrated in FIG. 5, four radio stations (station "1", station "2", station "3", and station "4") are listed in the list of station information. For example, the top row in the list of station information displays station information in which the station name is "Station 2", the radio station is located at a latitude of "35.65XX" and a longitude of "139.89XX", the opposing radio station is located at a latitude of "35.73XX" and a longitude of "139.94XX", the system name is "System_23", and the center frequency is "2.24XX MHz". For example, the fourth row (lowermost row) in the list of station information displays station information in which the station name is "Station 1", the radio station is located at a latitude of "35.39XX" and a longitude of "139.58XX", the opposing radio station is located at a latitude of "35.52XX" and a longitude of "139.91XX", the system name is "System_24", and the center frequency is "2.24XX MHz".

In the station DB management screen sm illustrated in FIG. 5, the station information of the third row in the list of station information is highlighted. This highlighting indicates that particular station information is selected in the list of station information. In this manner, with a particular station being selected from the list of station information, if the "Add" button, the "Modify" button, or the "Delete" button arranged on the bottom part of the station DB management screen is depressed, new station information is added, the station information stored in the station DB 201 is modified, or the station information stored in the station DB 201 is deleted.

As such, the station DB management screen sm illustrated in FIG. 5 enables the management of the station DB 201 storing the station information of radio stations (interfering station information and interfered station information), the information being used for the interference calculation.

Figure 6:
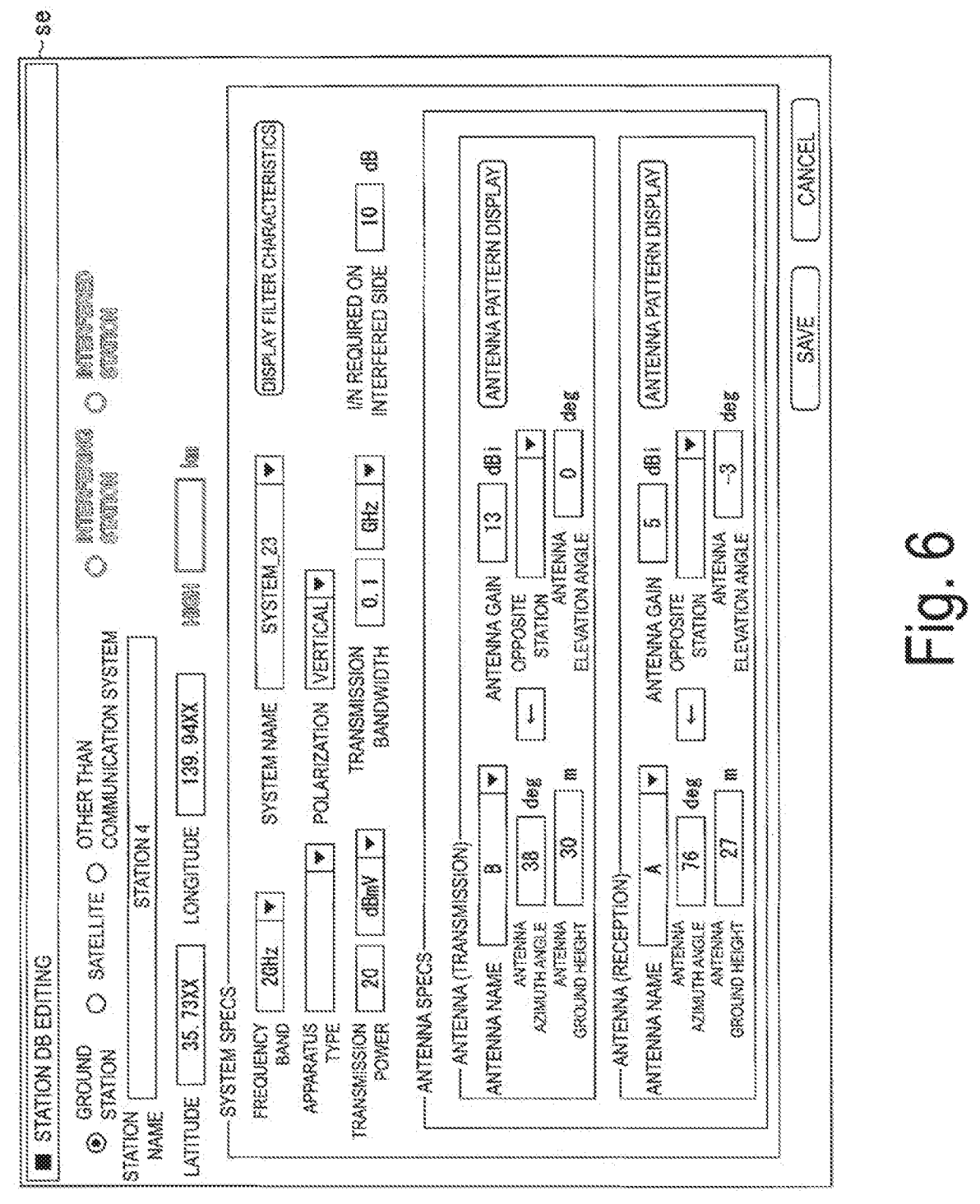

A station DB editing screen displayed on the display unit 302 will be described below. FIG. 6 is a schematic view illustrating an example of the station DB editing screen displayed by the interference evaluation apparatus 1 according to the embodiment of the present invention.

A station DB editing screen se illustrated in FIG. 6 is a setting screen for editing the station information stored in the station DB 201.

Note that the station DB editing screen se is generated by the station information input/registration unit 13, and is displayed by the display unit 302. The station information input/registration unit 13 controls display of the station DB editing screen se by the display unit 302, based on the information input through the operation input unit 301.

As illustrated in FIG. 6, radio buttons for selecting any one of the items of "Ground station", "Satellite", and "Other than communication system" are arranged on the top of the station DB editing screen se. Items displayed on the lower part of the station DB editing screen se differ depending on a selection of the radio button corresponding to any one of these items.

In the station DB editing screen se illustrated in FIG. 6, the radio button of "Ground station" is selected. Thus, for example, setting items such as "Height of orbit" required for the "Satellite" are hidden. For example, if the radio button of "Other than communication system" is selected, setting items related to "Antenna specification" are hidden.

As illustrated in FIG. 6, items of the station information to be set on the station DB editing screen se can be classified into "Station name", "Location (latitude and longitude)", "System specification", and "Antenna specification". The setting items belonging to the system specification include "Frequency band", "System name", "Filter characteristics", "Apparatus type", "Polarization", "Transmission power", "Transmission bandwidth", and "I/N required on interfered side".

The "Frequency band" indicates a band of frequency used for radio communication. A value for this "Frequency band" is an important parameter when the candidates of the radio stations to be subjected to the interference evaluation are narrowed.

Note that although a setting item for setting the "Center frequency" is not displayed in the station DB editing screen se illustrated in FIG. 6, the setting item may be displayed. As with the "Frequency band", this "Center frequency" is also an important parameter when it is determined whether or not the radio station is to be subjected to the interference evaluation. For example, in an interfering station and an interfered station, if the center frequencies are the same or close to each another, then the interfering station and the interfered station are to be subjected to the interference evaluation, and if the center frequencies are greatly different from each other, then the interfering station and the interfered station are not to be subjected to the interference evaluation.

The "System name" indicates a name of a radio system used for communication. The "Filter characteristics" indicates characteristics of a filter conforming to the frequency band. The "Apparatus type" indicates a type of radio apparatus in a radio system. In the setting item of "Polarization", a pull-down menu is used to select "Vertical polarization (V polarization)", "Horizontal polarization (H polarization)", or "Circular polarization" (in a case of the satellite, for example). The "Transmission power" indicates power to be transmitted as radio waves to an antenna from radio transmission.

The "Transmission bandwidth" indicates a range of frequency occupied by carrier wave modulation. Note that the transmission bandwidth is also referred to as "occupied bandwidth" or simply "bandwidth". The transmission bandwidth is computed based on a difference between the highest frequency and the lowest frequency used for radio transmission. The "I/N required on interfered side" is an index value serving as a criterion for determining acceptable interference power. Specifically, a value obtained by adding system noise NS [dBm] and I/N required on interfered side [dBm] (NS+ I/N required on interfered side [dBm]) is acceptable interference power.

As illustrated in FIG. 6, the setting items of "Antenna specification" include setting items on a transmission side and setting items on a reception side. Note that in radio stations used for communication, a transmission antenna and a reception antenna are often used together. Thus, parameter values of both of the transmission side and the reception side are the same values in many cases. However, the specification related to antenna can be set on the transmission side and the reception side individually in the station DB editing screen se illustrated in FIG. 6 to handle a case where a transmission antenna and a reception antenna are separate antennas.

As illustrated in FIG. 6, the setting items of "Antenna specification" include "Antenna name", "Antenna gain", "Antenna azimuth angle", "Antenna ground height", and "Antenna elevation angle" (in both the transmission side and the reception side).

The antenna name indicates an antenna installed in the radio station. The "Antenna gain" indicates a gain acting on the transmission power by the antenna, and also includes directivity of antenna patterns. The "Antenna azimuth angle" indicates a direction in a horizontal plane to which the antenna is facing. Note that in general radio communication, an associated opposite station is often located in an orientation indicated by this "Antenna azimuth angle". The "Antenna ground height" indicates the height from the ground of the installed antenna. In a case where the interference evaluation is performed in consideration of tomographic features, a value obtained by adding elevation to this "Antenna ground height" is used for the interference calculation. The "Antenna elevation angle" indicates a direction in a vertical plane of the antenna.

As illustrated in FIG. 6, a setting item of "Opposite station" is configured to be selectable by a pull-down menu. Thus, a desired radio station is selectable from the candidates of the radio stations displayed in the pull-down menu, the radio stations being stored in the station DB 201.

Alternatively, if the number of radio stations stored in DB is large, the stations that has been narrowed and listed on the screen se in the station DB management illustrated in FIG. 5 may be displayed in the pull-down menu for selection. After the "Opposite station" is selected, if a button of "←(left arrow)" displayed on the left of the "Opposite station" item is depressed, then it is possible to automatically calculate the antenna azimuth angle from the location (latitude, longitude) of the radio station and the location (latitude, longitude) of the selected opposite station, and to automatically set the calculated value. Note that the antenna azimuth angle is, for example, an angle in a clockwise direction with a north direction as 0 degrees.

In this way, a function of setting the antenna azimuth angle from the button of "←(left arrow)" after the "Opposite station" is selected by the pull-down menu is provided for each of the transmission antenna and the reception antenna. For example, in a case of a relay station, the antenna azimuth angle of the transmission antenna and the antenna azimuth angle of the reception antenna may each be directions of opposite stations different from each other.

Note that when a value of each of the above-described setting items is registered or modified, then a "Save" button arranged on the bottom part of the station DB editing screen se is depressed, new station information is added to the station DB 201, or the station information already stored in the station DB 201 is modified.

As described above, in the interference evaluation apparatus 1, the antenna direction is automatically calculated and set based on the opposite station, and thus, a more accurate value can be easily obtained in the interference evaluation considering attenuation of antenna pattern characteristics.

Figure 7:
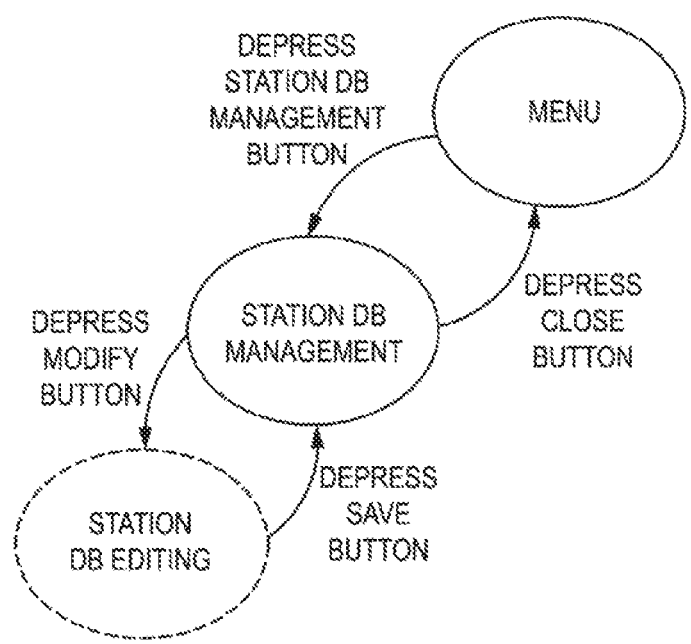
FIG. 7 is a diagram for explaining screen transition of a display screen displayed by the interference evaluation apparatus 1 according to the embodiment of the present invention.

Screen transition of a display screen in the station DB management will be described below. FIG. 7 is a diagram for explaining screen transition of the display screen displayed by the interference evaluation apparatus 1 according to the embodiment of the present invention.

As illustrated in FIG. 7, the display screen transits from the main menu screen to the station DB management screen. Then, the display screen transits from the station DB management screen to the station DB editing screen. Note that the main menu screen referred here is, for example, the main menu screen m illustrated in FIG. 3. The station DB management screen referred here is, for example, the station DB management screen sm illustrated in FIG. 5. The station DB editing screen referred here is, for example, the station DB editing screen se illustrated in FIG. 6.

The station information managed and edited via these display screens is selectively used when an interfering station and an interfered station are set on a screen for calculation condition setting described below. This allows a user to select desired station information from the station information stored in the station DB 201, without precisely examining the information of the interfering station and the interfered station, in the interference evaluation. As a result, the interference evaluation is much easier.

Map-Based Interference Evaluation

Map-based interference evaluation will be described below.

FIG. 8 is a schematic view illustrating an example of an execution condition designation screen in the map-based interference evaluation displayed by the interference evaluation apparatus 1 according to the embodiment of the present invention.

Note that an execution condition designation screen h1 illustrated in FIG. 8 is generated by the calculation condition setting unit 16, and is displayed by the display unit 302. The calculation condition setting unit 16 controls display of the execution condition designation screen h1 by the display unit 302, based on the information input through the operation input unit 301.

As illustrated in FIG. 8, items for designating "Calculation method" are displayed on the uppermost part of the execution condition designation screen h1. In FIG. 8, "Point calculation" is selected by checking "Point calculation" through a radio button in the items for designating the "Calculation method".

As such, if the "Point calculation" is selected in the items for designating the "Calculation method", the execution condition designation screen h1 displays a screen as illustrated in FIG. 8. In other words, the screen as illustrated in FIG. 8 is a screen for designating an execution condition for calculating interference between an interfering station and an interfered station in a case where each of the location of the interfering station and the location of the interfered station is known in advance.

As illustrated in FIG. 8, a "Select for interfering station" button and a "Select for interfered station" button are arranged on the execution condition designation screen h1. If these "Select for interfering station" button and "Select for interfered station" button are depressed, station information of a radio station to be set as the interfering station and station information of a radio station to be set as the interfered station are each selected from the station information stored in the station DB 201 to be designated as the execution conditions of the interference calculation.

If the "Select for interfering station" button and the "Select for interfered station" button are depressed and the station information of the interfering station and the interfered station are designated, a list of the designated station information, which are read out from the station DB 201, is displayed in a list display region of "Information of interfering station and interfered station" displayed on a middle part of the execution condition designation screen h1. As illustrated in FIG. 8, the list displayed in the list display region of the "Information of interfering station and interfered station" includes items of "Interfering/Interfered", "Station name", "Latitude 1", "Longitude 1", "Latitude 2", "Longitude 2", "System name", and "Antenna name".

The column of the item of "Interfering/Interfered" displays information indicating whether the selected radio station is an interfering station or an interfered station (i.e., either value of "Interfering" or "Interfered").

The column of the item of "Station name" displays a name of the selected interfering station or interfered station.

The columns of the items of "Latitude 1" and "Longitude 1" respectively display the latitude and longitude of a point at which the selected interfering station or interfered station is installed.

The columns of the items of "Latitude 2" and "Longitude 2" respectively display the latitude and longitude of a point at which an opposite station opposing the selected interfering station or interfered station is installed.

The column of the item of "System name" displays a name of a radio system used in the selected interfering station or interfered station.

The column of the item of "Antenna name" displays a name of an antenna used for the selected interfering station or interfered station.

In the execution condition designation screen h1 illustrated in FIG. 8, the list displayed in the list display region of the "Information of interfering station and interfered station" displays station information of the four selected radio stations. As illustrated, in the station information displayed on the top row of the list, information displayed in the items of "Interfering/Interfered", "Station name", "Latitude 1", "Longitude 1", "System name", and "Antenna name" is "Interfering", "Station 2", "35.65X", "139.84X", "System_52", and "B", respectively.

This shows that the radio station indicated in the station information displayed on the top row of the list is selected as an "Interfering station", whose name is "Station 2", is installed at a point at the latitude and longitude of "35.65X" and "139.84X", uses a radio system named "System_52", and uses an antenna named "B".

The information indicating the execution conditions of the interference calculation designated in the execution condition designation screen h1 illustrated in FIG. 8 is temporarily stored and subsequently registered in the history storage unit 202. This temporary storage and registration in the history storage unit 202 are performed by depressing a "Temporary storage" button arranged on the bottom part of the execution condition designation screen h1.

If a "History selection" button on the top right side of the execution condition designation screen h1 is depressed, information indicating execution conditions designated in the past interference calculation can be read out from the history storage unit 202. This allows designation of execution conditions by reusing the execution conditions designated in the past interference calculation from the history information stored in the history storage unit 202. If the "History selection" button is depressed, the display screen transits to, for example, a history selection screen h2 as illustrated in FIG. 9.

Figure 9:
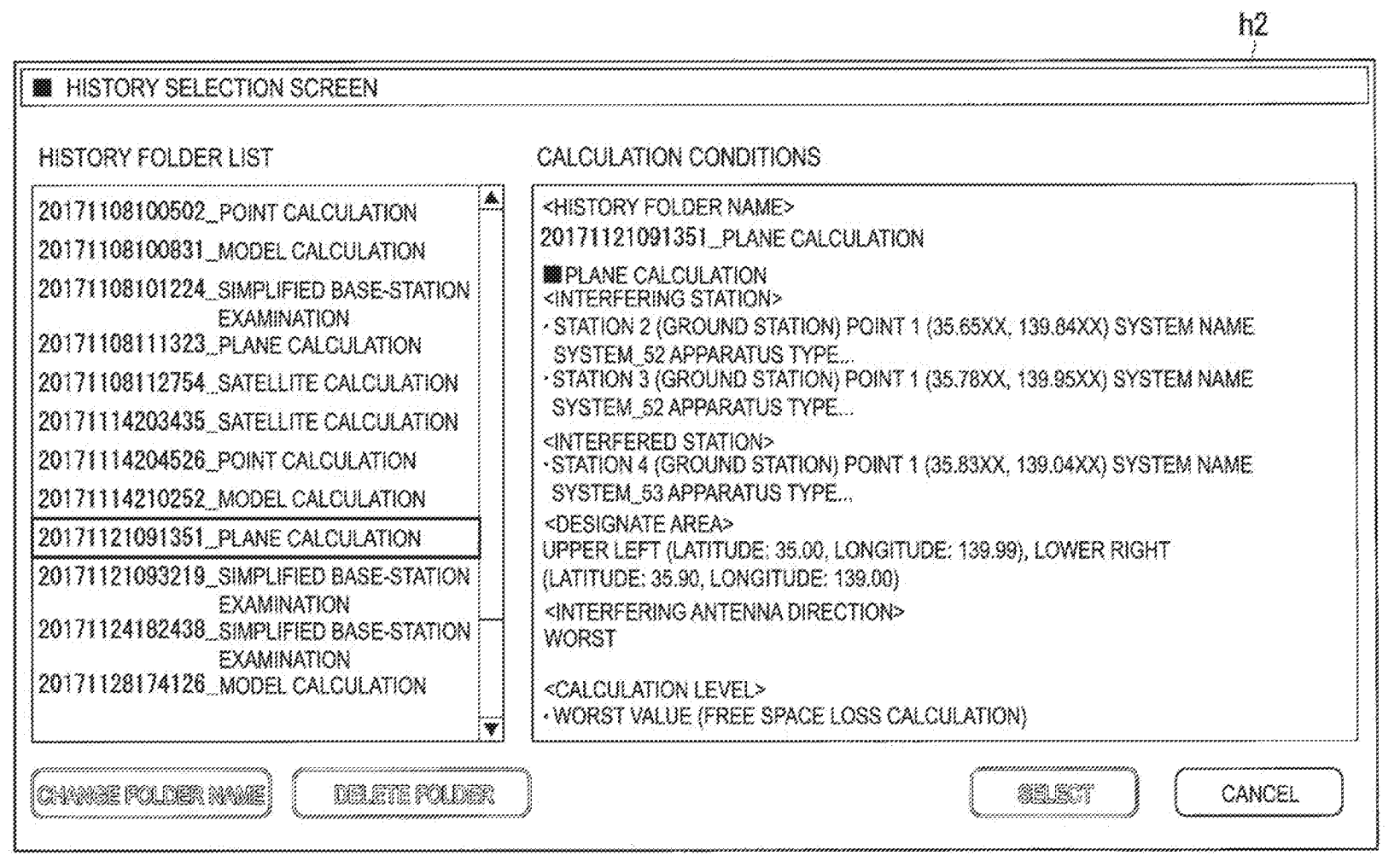

FIG. 9 is a schematic view illustrating an example of a history selection screen in the map-based interference evaluation displayed by the interference evaluation apparatus 1 according to the embodiment of the present invention. In the history selection screen h2 illustrated in FIG. 9, history information stored in the history storage unit 202 is read out and displayed. In the history selection screen h2, a desired execution condition designated in the past interference calculation is selected from the displayed history information to be reused for an execution condition of the interference calculation.

Note that the history selection screen h2 illustrated in FIG. 9 is generated by the history selection unit 15, and is displayed by the display unit 302. The history selection unit 15 controls display of the history selection screen h2 by the display unit 302, based on the information input through the operation input unit 301.

As illustrated in FIG. 9, a display field of "History folder list" is displayed on the left side of the history selection screen h2, and a display field of "Calculation conditions" is displayed on the right side. In the display field of "History folder list", a list of folder names is displayed such as "20171108100502_point calculation" and "20171108100831_model calculation". The folder names included in this list are folder names of the folders (history folders) in which the history information is stored in the history storage unit 202.

For example, as illustrated in FIG. 9, if "20171121091351_plane calculation" is selected in the list displayed in the display field of "History folder list", the history information stored in the selected history folder is displayed in the display field of "Calculation conditions". In the display field of "Calculation conditions" of the history selection screen h2 illustrated in FIG. 9, information related to the interfering station and the interfered station, and information indicating calculation conditions, for example are displayed. The information related to the interfering station and the interfered station includes, for example, a station name, an installed location (latitude and longitude), a system name, and an apparatus type.

In the display field of "History folder list" of the history selection screen h2 illustrated in FIG. 9, the history folder of "Plane calculation" is selected, and thus, information related to "Area designation" is displayed in the display field of "Calculation conditions". This information related to "Area designation" includes information indicating a range of a region for which a plane calculation is performed (i.e., the latitude and longitude of each of the upper left and lower right points (in a map with north direction upward) in a region for which a plane calculation is performed).

The display field of "Calculation conditions" of the history selection screen h2 illustrated in FIG. 9 displays information indicating an antenna direction of the interfering station, information indicating calculation level, and the like. Here, "worst" in the antenna direction indicates that the antenna is facing in a direction toward the interfered station. Additionally, the "worst" in the antenna direction indicates that the antenna direction is an antenna direction with a constant angle offset relative to an interfered station, or an interfering station antenna designates a certain direction. For the calculation level, there is attenuation consideration due to tomographic features and buildings, or the like in addition to "worst (free space loss calculation)".

As such, in the history selection screen h2, details of the history information stored in the history folder (such as the execution conditions of the interference calculation) can be displayed for each of the history folders included in the list displayed in the display field of "History folder list". This allows a user to select the history information while the user checks each one of the details of the history information on the history selection screen h2.

In other words, the history selection screen h2 has a mechanism allowing a user to select the history information while the user concurrently checks both the method of the interference evaluation (for example, point calculation, plane calculation, and model calculation) and the execution conditions of the interference calculation (for example, station name, type, location, and system name), based on each piece of the history information. This mechanism enables more appropriate selection of the history information in a future interference evaluation.

Note that the display field of "Calculation conditions" in the history selection screen h2 illustrated in FIG. 9 also displays the name of the history folder ("History folder name") selected in the list displayed in the display field of "History folder list". This allows a user to check the information indicating the method of the interference evaluation and the information indicating the execution conditions of the interference calculation included in the selected history information by simply referring to only the display field of "Calculation conditions".

Note that if a history folder is selected from the list displayed in the display field of "History folder list", a "Select" button arranged on the bottom part of the history selection screen h2 switches from a state where the "Select" button is depressible to a state where the "Select" button is not depressible. If the "Select" button is depressed, execution conditions of the interference calculation based on the history information are set in the execution condition designation screen h1 illustrated in FIG. 8.

Specifically, in a case of the history selection screen h2 illustrated in FIG. 9, for example, the history information stored in the selected history folder of "20171121091351_plane calculation" includes information indicating calculation level designation (information for designating each of "Consider attenuation due to tomographic features", "Consider attenuation due to buildings", and "Consider additional losses"), in addition to the calculation method ("Point calculation") of the interference evaluation, and the interfering station and the interfered station to be subjected to the execution condition setting of the interference calculation illustrated in FIG. 8. This allows a user to set all settings items that need to be set as execution conditions of the interference calculation by simply selecting a history folder from the history folder list.

Figure 10:
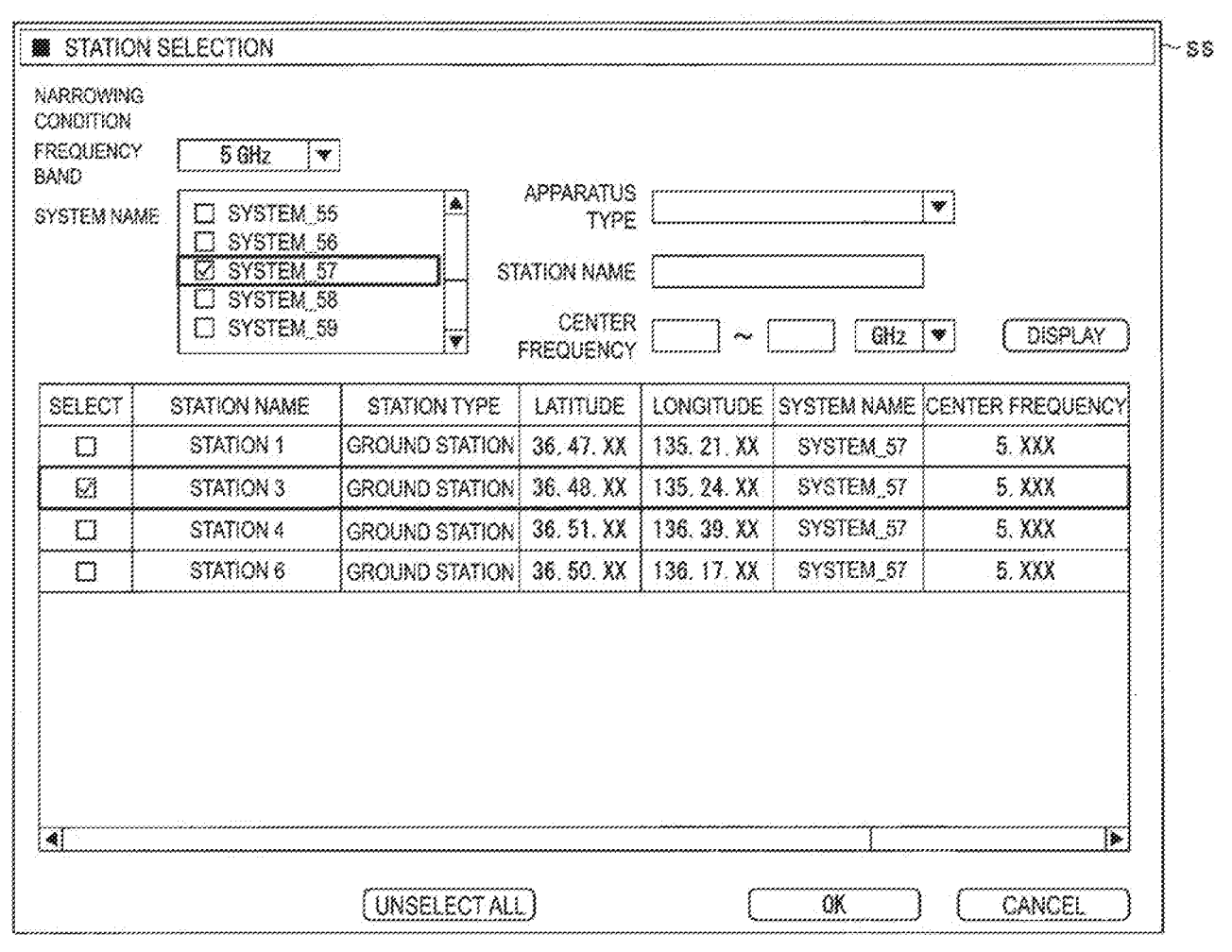

A station selection screen for selecting an interfering station and an interfered station to be set as an execution condition of the interference calculation will be described below. FIG. 10 is a schematic view illustrating an example of a station selection screen displayed by the interference evaluation apparatus 1 according to the embodiment of the present invention. A station selection screen ss illustrated in FIG. 10 is a screen to be displayed when the "Select for interfering station" button or the "Select for interfered station" button is depressed in the execution condition designation screen h1 illustrated in FIG. 8.

Note that the station selection screen ss is generated by the station information input/registration unit 13, and is displayed by the display unit 302. The station information input/registration unit 13 controls display of the station selection screen ss by the display unit 302, based on the information input through the operation input unit 301.

As illustrated in FIG. 10, a pull-down menu for selecting "Frequency band" is arranged in a display region of "Narrowing conditions" displayed on the top part of the station selection screen ss. A display region of "System name" is arranged below the display region of "Frequency bands", in which a list of system names is displayed. If a frequency band to be used by the radio station is selected by the above-described pull-down menu, the system names to be displayed in the list are narrowed.

For example, the station selection screen ss illustrated in FIG. 10 represents a state where a 5 GHz frequency band is selected by the pull-down menu. Thus, only the system names of radio systems using 5 GHz band are displayed in the list of "System name". Noted that it is generally important to narrow candidates of the radio stations to be subjected to the interference calculation by the frequency band. This is because, if the same frequency band is used, influence of the interference may occur even between different radio systems.

Interference occurs in a case of using the same radio system. When performing interference evaluation between radio stations using the same radio systems, a user selects the same radio system from the list of "System name" to depress a "Show" button. If the "Show" button is depressed, as illustrated in FIG. 10, a list of radio stations is displayed in the display region on the lower part of the station selection screen ss. A radio station to be subjected to the interference evaluation can be selected from the displayed list.

Candidates of the radio stations to be subjected to the interference calculation can also be narrowed by "Apparatus type" (for example, relay station, base station, or terminal station). In the station selection screen ss illustrated in FIG. 10, the "Apparatus type" can be selected by the pull-down menu, and thus a user can easily narrow the candidates of the radio stations to be subjected to the interference calculation by selecting the apparatus type. If the "Apparatus type" is selected and the "Show" button is depressed, the radio stations to be displayed in the list are narrowed. This allows a user to easily select a radio station to be subjected to the interference evaluation from the narrowed radio stations.

In the station selection screen ss illustrated in FIG. 10, a list of "System name" displays "System_55", "System_56", "System_57", "System_58", and "System_59". Here, as illustrated in FIG. 10, for example, if only a check box of "System_57" is selected, a list of radio stations using the radio system corresponding to "System_57" is displayed on the lower part of the station selection screen ss.

The station selection screen ss illustrated in FIG. 10 displays a list including station information of four radio stations. For example, the station information displayed on the top row of the list shows that "Station name" is "Station 1", "Station type" is "Ground station", the latitude is "36.47.XX", the longitude is "135.21.XX", "System name" is "System_57", and the center frequency is "5.XXX (GHz)".

If station information of a desired radio station is selected from the station information of a plurality of radio stations displayed on the station selection screen ss illustrated in FIG. 10, the station information of the selected radio station is set as an execution condition of the interference calculation in the execution condition designation screen h1 illustrated in FIG. 8. For example, in the station selection screen ss illustrated in FIG. 10, the station information displayed on the second row of the list is selected by the check box. A user selects station information of a desired radio station from the list by a check box and depresses an "OK" button arranged on the bottom part of the station selection screen ss. This allows the user to easily set a desired radio station as an interfering station or an interfered station.

Note that the station selection screen ss illustrated in FIG. 10 is a screen example in which radio stations to be subjected to the interference evaluation are narrowed by a frequency band. However, radio stations can be narrowed based on the "Center frequency" rather than the "Frequency band". For example, the user designates conditions as "5.000" to "5.999" and "GHz" in the display region of "Center frequency" displayed in the station selection screen ss illustrated in FIG. 10, and then depresses the "Show" button. This narrows the candidates of the radio station to be subjected to the interference evaluation by the center frequency.

In general, the influence of the interference may occur between different radio systems using the same frequency band or between different radio systems whose center frequencies have close values, and thus, the frequency band and the center frequency are important parameters for performing interference evaluation. Note that in a case where radio stations to be subjected to the interference evaluation are narrowed based on the center frequency, a value of center frequency needs to be set as a narrowing condition with a certain tolerance in consideration of various parameters (for example, transmission bandwidth) to be input to the station DB editing screen se illustrated in FIG. 6.

Three examples are given below for the execution condition designation of the interference calculation (first interference calculation) in the map-based interference evaluation. The three examples referred here include "Point-to-point calculation", "Plane calculation", and "Interference calculation between satellite and ground station".

First, the "Point-to-point calculation" will be described.

FIG. 11 is a schematic view illustrating an example of an execution condition designation screen displayed by the interference evaluation apparatus 1 according to the embodiment of the present invention. An execution condition designation screen hp illustrated in FIG. 11 is an example of a screen in which an execution condition of the interference calculation based on the point-to-point calculation is set.

Note that the execution condition designation screen hp illustrated in FIG. 11 is generated by the calculation condition setting unit 16, and is displayed by the display unit 302. The calculation condition setting unit 16 controls display of the execution condition designation screen hp by the display unit 302, based on the information input through the operation input unit 301.

As illustrated, items for designating "Calculation method" are displayed on the uppermost part of the execution condition designation screen hp. In FIG. 11, the point-to-point calculation is selected by checking "Point calculation" by a radio button in the items for designating the "Calculation method".

Here, in the point-to-point calculation, interference calculation is performed based on a location of an interfering station and a location of an interfered station if each of the location of the interfering station and the location of the interfered station is known in advance, and determination is made as to whether or not the influence of the interference occurs in the interfered station.

As illustrated in FIG. 11, the display region of "Information of interfering station and interfered station" on the execution condition designation screen hp displays a list of station information of the interfering station and station information of the interfered station that are selected as a target of the interference calculation. As illustrated, the station information displayed in this list includes "Interfering/Interfered" which is an item for distinguishing whether a radio station is an interfering station or an interfered station, "Station name", "Latitude 1" and "Longitude 1" indicating a location at which a radio station is installed, "System name" indicating a name of a radio system used in a radio station, and "Antenna name" indicating a name of an antenna used in a radio station.

The list of the station information of the interfering station and the station information of the interfered station displayed on the execution condition designation screen hp illustrated in FIG. 11 includes station information of two interfering stations and station information of one interfered station. That is, four radio stations are set as a target of the interference evaluation.

For example, as illustrated in FIG. 11, the top row of the list displays station information in which "Interfering/Interfered" is "Interfering", "Station name" is "Station 2", "Latitude 1" is "35.65X", "Longitude 1" is "139.84X", "System name" is "System_52", and "Antenna name" is "B". For example, as illustrated in FIG. 11, the second row of the list is in a selected state, displaying station information in which "Interfering/Interfered" is "Interfering", "Station name" is "Station 3", "Latitude 1" is "35.58X", "Longitude 1" is "139.74X", "System name" is "System_52", and "Antenna name" is "B".

As illustrated in FIG. 11, there are displayed, on the bottom part of the execution condition designation screen hp, check boxes for selecting whether or not to consider three conditions of "Attenuation due to tomographic features", "Attenuation due to buildings", and "Additional losses" as the execution condition of the interference calculation. If considering these items is selected, attenuation is computed based on map information including necessary topographical information and building height information, an amount of additional losses is set based on the determination of a user, and then these resultants are reflected in the interference calculation.

Note that an example of a calculation formula for calculating radio wave attenuation in the interference calculation includes a square root law, or a calculation formula disclosed in Patent Literature 3(formulas (1) to (8) in Patent Literature 3) in which the calculation takes into account ridge when the view is obstructed geographically.

Next, the "Plane calculation" will be described.

FIG. 12 is a schematic view illustrating an example of an execution condition designation screen displayed by the interference evaluation apparatus 1 according to the embodiment of the present invention. An execution condition designation screen hs illustrated in FIG. 12 is an example of a screen in which an execution condition of the interference calculation based on the plane calculation is set.

Note that the execution condition designation screen hs illustrated in FIG. 11 is generated by the calculation condition setting unit 16, and is displayed by the display unit 302. The calculation condition setting unit 16 controls display of the execution condition designation screen hs by the display unit 302, based on the information input through the operation input unit 301.

As illustrated, items for designating "Calculation method" are displayed on the uppermost part of the execution condition designation screen hs. In FIG. 12, the plane calculation is selected by checking "Plane calculation" by a radio button in the items for designating the "Calculation method".

Here, in the plane calculation, a location of one radio station (for example, an interfered station) from among a location of an interfering station and a location of an interfered station is fixed, and a range is indicated in which the one radio station receives the influence of the interference based on an area (range) in which the other radio station (for example, an interfering station) is located. Specifically, a range designated in the periphery of the former radio station (for example, the interfered station) is sectioned into meshes (in a net-like pattern), and the interference calculation is performed in a planar manner, assuming that the latter radio station (for example, the interfering station) is present in each of the meshes. This allows determination of a range in which the former radio station (for example, the interfered station) receives the influence of the interference.

As illustrated in FIG. 12, the display region of "Information of interfering station and interfered station" on the execution condition designation screen hs displays a list of station information of the interfering station and station information of the interfered station that are selected as a target of the interference calculation, as in the execution condition designation screen hp illustrated in FIG. 11.

As illustrated, the station information displayed in this list includes "Interfering/Interfered" which is an item for distinguishing whether a radio station is an interfering station or an interfered station, "Station name", "Latitude 1" and "Longitude 1" indicating a location at which a radio station is installed, "System name" indicating a name of a radio system used in a radio station, and "Antenna name" indicating a name of an antenna used in a radio station.

As illustrated in FIG. 12, items of "Area designation" (range designation based on two latitudes and longitudes) for designating an area to perform the interference calculation and items of "Interfering station antenna direction" are displayed on the lower part of the execution condition designation screen hs, in addition to items for designating whether or not to consider attenuation or losses (i.e., check boxes for selecting whether or not to consider three conditions of "Attenuation due to tomographic features", "Attenuation due to buildings", and "Additional losses" as the execution condition of the interference calculation) displayed on the execution condition designation screen hp illustrated in FIG. 11.

In the item of "Interfering station antenna direction", if "Worst" (i.e., the worst case condition) is designated, interference calculation is always performed for a case where an antenna direction of the interfering station is directed toward the interfered station. When the antenna of the interfering station is facing toward of the interfered station, the interference amount is the greatest.

In the item of "Interfering station antenna direction", the interference amount can also be calculated by designating the antenna direction of the interfering station among the north, south, east, and west, or by designating the antenna direction of the interfering station to always have a certain angle with respect to the direction of the interfered station. As illustrated in FIG. 12, the "Interfering station antenna direction" is selected by the radio button.

Note that an example of a calculation formula for calculating radio wave attenuation in the interference calculation includes a square root law, or a calculation formula disclosed in Patent Literature 3 (formulas (1) to (8) in Patent Literature 3).

Next, the "Interference calculation between satellite and ground station" will be described.

Figure 13:
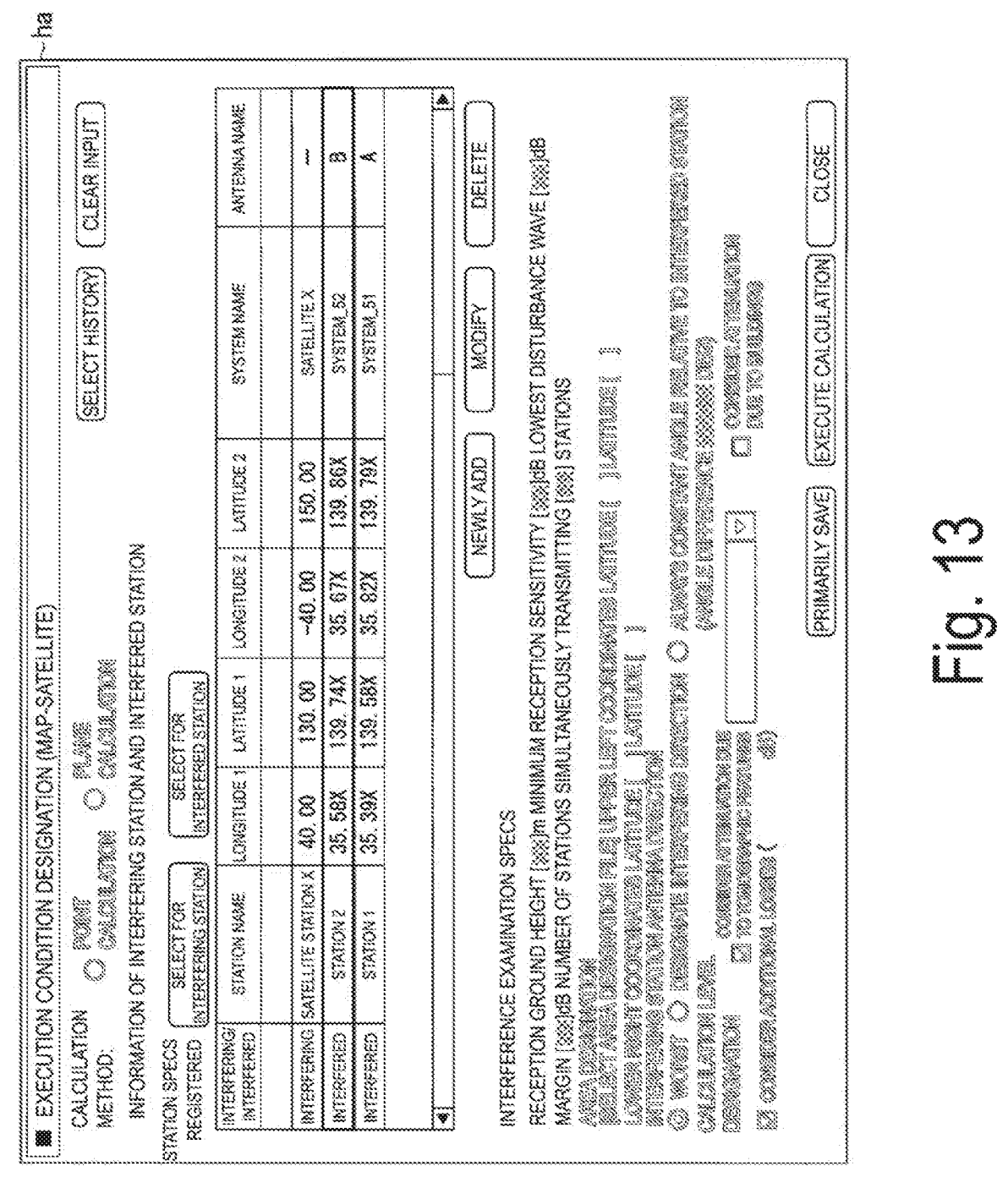

FIG. 13 is a schematic view illustrating an example of an execution condition designation screen displayed by the interference evaluation apparatus 1 according to the embodiment of the present invention. The execution condition designation screen hs illustrated in FIG. 12 is an example of a screen in which an execution condition of the interference calculation between a satellite and a ground station is set.

Note that the execution condition designation screen ha illustrated in FIG. 13 is generated by the calculation condition setting unit 16, and is displayed by the display unit 302. The calculation condition setting unit 16 controls display of the execution condition designation screen ha by the display unit 302, based on the information input through the operation input unit 301.

As illustrated, items for designating "Calculation method" are displayed on the uppermost part of the execution condition designation screen ha. However, the radio button for designating "Point calculation" or "Plane calculation" is not selectable (in a gray out state). This is because the (artificial) satellite is selected as the interfering station or the interfered station. If the satellite is selected as the interfering station or the interfered station, the interference calculation between satellite and ground station is performed.

In the interference calculation between satellite and ground station, calculation conditions are automatically determined by the control unit 10. The contents to be displayed on the execution condition designation screen ha are determined based on the determination of the calculation conditions. In the interference calculation between satellite and ground station, determination is also made as to whether the satellite is located at a position viewable from the ground station, that is, whether the satellite is located above in the sky when viewed from the ground station (whether the satellite is not located at a position hidden by the Earth). Note that the interference calculation between satellite and ground station is performed only if the satellite is determined to be located at a position viewable from the ground station. In the interference calculation between satellite and ground station, the interference amount in a case where the influence of the interference is the greatest is also calculated, and the calculated interference amount is displayed by the display unit 302.

The display region of "Information of interfering station and interfered station" on the execution condition designation screen ha illustrated in FIG. 13 displays a list of station information of the interfering station and station information of the interfered station that are selected as a target of the interference calculation, as in the cases of the execution condition designation screen hp illustrated in FIG. 11 and the execution condition designation screen hs illustrated in FIG. 12.

On the other hand, unlike the above-described cases of the execution condition designation screen hp illustrated in FIG. 11 and the execution condition designation screen hs illustrated in FIG. 12, in the items indicating execution conditions of the interference calculation displayed on the lower part of the execution condition designation screen ha illustrated in FIG. 13, items of "Reception ground height", a level of "Lowest reception sensitivity", a level of "Minimum disturbance wave", and "Number of stations simultaneously transmitting" are displayed as the item representing "Interference examination specification". A values for each of these items of the execution conditions of the interference calculation is designated by a user, and the interference calculation is performed.

Note that an example of calculation formula for calculating a specific amount of the interference between the satellite and the ground station includes a calculation formula disclosed in Patent Literature2 (formula (4) in Patent Literature 2) or the like.

As such, execution condition designation screens are basically displayed in a common display format for the calculation conditions in three different calculations (i.e., "Point-to-point calculation", "Plane calculation", and "Interference calculation between satellite and ground station". Whether or not setting of each of the items is required, is determined, in accordance with the calculation conditions. Then, according to this determination result, validity/invalidity of input to each of the items is set. This allows a user to easily recognize items for which setting is required and to more easily perform the interference calculation.

Display of a calculation result of the interference calculation in the map-based interference evaluation will be described below.

Figure 14:
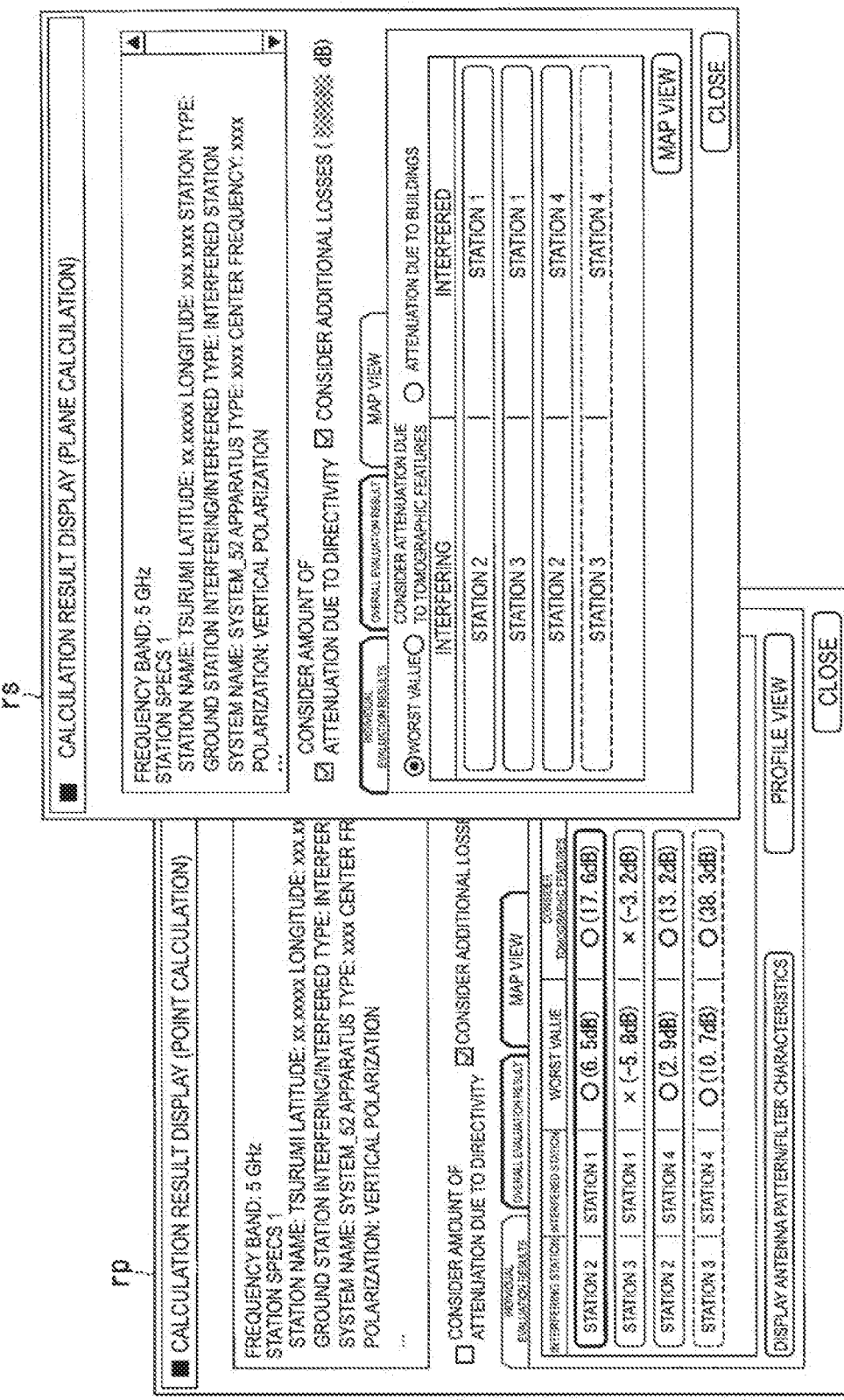
FIG. 14 is a schematic view illustrating an example of a calculation result display screen displayed by the interference evaluation apparatus 1 according to the embodiment of the present invention.

FIG. 14 is a schematic view illustrating an example of a calculation result display screen displayed by the interference evaluation apparatus 1 according to the embodiment of the present invention.

FIG. 14 illustrates a result display screen rp showing a calculation result based on the point-to-point calculation, and a result display screen rs showing a calculation result based on the plane calculation.

Note that the result display screen rp and the result display screen rs illustrated in FIG. 14 are generated by the calculation result display designation unit 17, and are displayed by the display unit 302. The calculation result display designation unit 17 controls display of the result display screen rp and the result display screen rs by the display unit 302, based on the information input through the operation input unit 301.

These two result display screens are switched by selecting one of an "Individual evaluation results" tab and a "Map view" tab, as illustrated in FIG. 14.

In a display region of "Individual evaluation results" in the calculation result display screen rp, calculation results are shown for a case where interference calculation is performed based on the execution conditions of the interference calculation that are set in the execution condition designation screen hp illustrated in FIG. 11, for the four radio stations selected as a target of the interference evaluation in the execution condition designation screen hp illustrated in FIG. 11.

In a display region of "Map results" in the calculation result display screen rs, calculation results are shown for a case where interference calculation is performed based on the execution conditions of the interference calculation that are set in the execution condition designation screen hs illustrated in FIG. 12, for the radio stations selected as a target of the interference evaluation in the execution condition designation screen hp illustrated in FIG. 12.

In both the calculation result display screen rp and the calculation result display screen rs, an interfering station and an interfered station to be subjected to the interference calculation, and a calculation condition are displayed on the top part of the screen.

In the calculation result display screen rp, a display region is displayed for setting the execution conditions of the evaluation calculation, which designates whether or not to consider attenuation due to directivity and additional losses, respectively. In response to the selection of the execution conditions of the interference calculation, a profile view is displayed. The profile view will be described in detail later.

A list showing a combination of the interfering station and the interfered station to be evaluated and a calculation result are displayed on the lower part of the calculation result display screen rp. Here, numerical values of the interference calculation results in combinations of the interfering station and the interfered station are indicated, in which "Station 2" and "Station 3" are defined as the interfering station and "Station 1" and "Station 1" are defined as the interfered station. Information (numerical values) indicating a determination result of whether or not numerical values of the interference result (numerical values in parentheses) is a numerical value obtained when the interfering station and the interfered station can be used together, and information indicating whether or not the interference calculation result is acceptable are also indicated (by an "o" mark or an "x" mark).

In the calculation result display screen rs, a display region is displayed for setting the execution conditions of the evaluation calculation, which designates whether or not to consider attenuation due to directivity and additional losses, respectively. There is also displayed radio buttons for selecting whether to calculate with considering attenuation due to tomographic features, to calculate with considering attenuation due to buildings, or to calculate the worst value without considering any attenuation, on the bottom part of the calculation result display screen rs. In response to the selection of the execution conditions of the interference calculation, a map is displayed. The map view will be described in detail later.

An example of a result display of the interference calculation based on the point-to-point calculation, to which a display condition has been set in the calculation result display screen rp illustrated in FIG. 14, will be described below.

Figure 15:
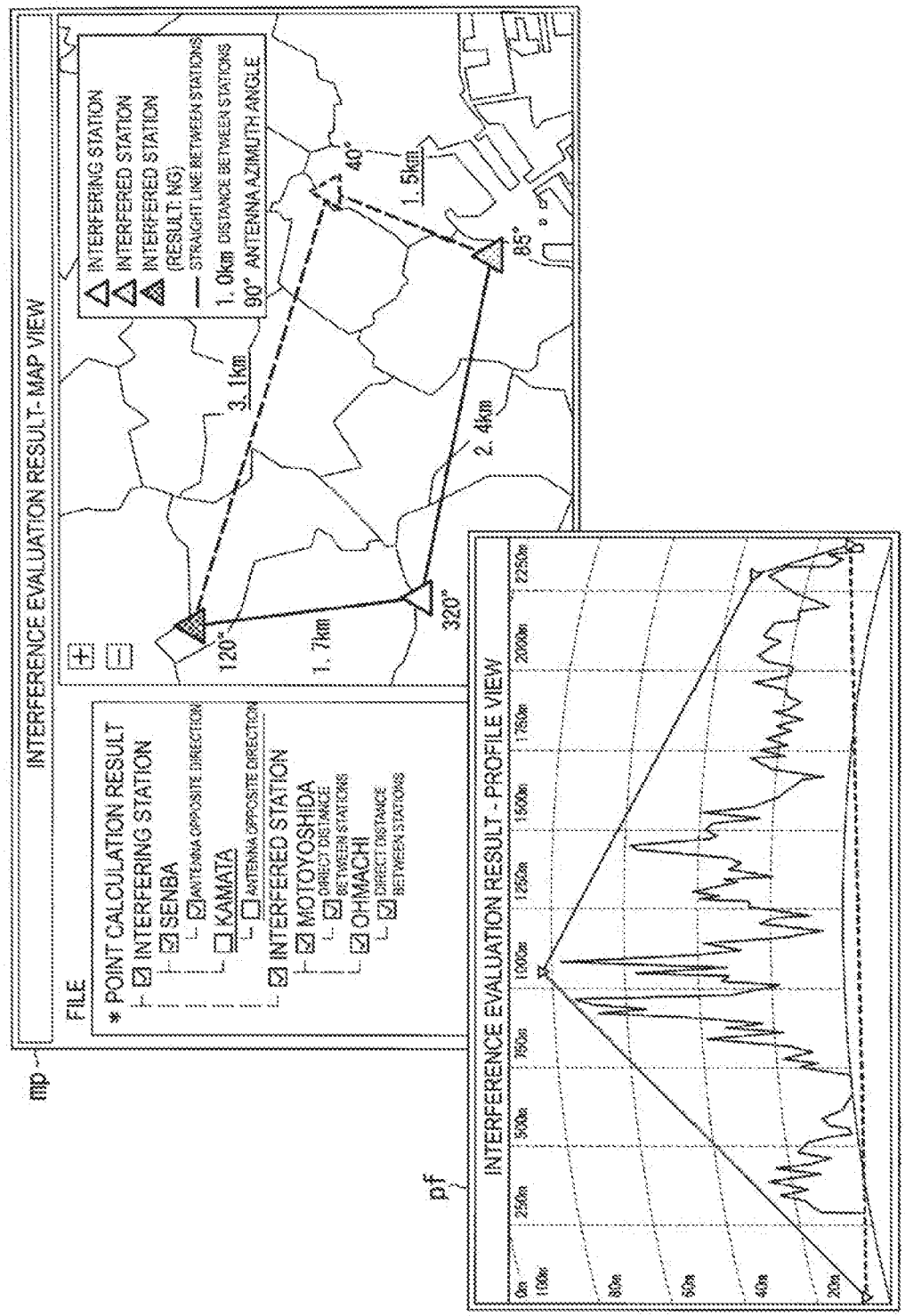
FIG. 15 is a schematic view illustrating an example of an interference evaluation result screen displayed by the interference evaluation apparatus 1 according to the embodiment of the present invention.

FIG. 15 is a schematic view illustrating an example of an interference evaluation result screen displayed by the interference evaluation apparatus 1 according to the embodiment of the present invention. FIG. 15 illustrates an interference evaluation result screen mp showing, on a map, a calculation result of the interference calculation based on the point-to-point calculation, and an interference evaluation result screen pf showing, in a profile view, a calculation result of the interference calculation based on the point-to-point calculation.

Note that the interference evaluation result screen mp and the interference evaluation result screen pf illustrated in FIG. 15 are generated by the calculation result diagram display unit 19, and are displayed by the display unit 302. The calculation result diagram display unit 19 controls display of the interference evaluation result screen mp and the interference evaluation result screen pf by the display unit 302, based on the information input through the operation input unit 301.

In the interference evaluation result screen mp, positional relationships and distances between each other for two interfering stations and two interfered stations are displayed on the map. Note that a radio station indicated by the solid-line triangle mark represents a radio station for which a check box displayed in a "Files" field on the left side of the map is selected. A radio station indicated by the broken-line triangle mark represents a radio station for which a check box displayed in the "Files" field on the left side of the map is not selected.

In the map shown in the interference evaluation result screen mp, the distances from the interfering station to two interfered stations, whose check boxes are selected, are "2.4 km" and "1.7 km", respectively, as illustrated in FIG. 15. Also shown on the map is that the antenna directions of three radio stations (one interfering station and two interfered stations whose check boxes are selected) respectively face 320° (north-northwest direction), 120° (approximately southeast direction), and 85° (approximately south direction) in a clockwise direction (with the north direction as reference 0°).

In the Files field displayed on the left side of the map, items indicating two interfering stations and two interfered stations, direct distances of two sets of the interfering stations and the interfered stations, or the like, which are displayed on the map of the interference evaluation result screen mp, are each displayed in a tree view as a parts list. With this tree view, a user can switch whether or not to display each of the parts by selecting check boxes.

The profile view displayed on the interference evaluation result screen pf displays a situation such as topographical change and the presence of buildings on a straight line connecting a certain interfering station and a certain interfered station. The interference evaluation result screen pf illustrated in FIG. 15 shows that both the interfering station and the interfered station have the antenna height of around 10 m. Also shown is that the distance between the interfering station and the interfered station is approximately 2.4 km. Also shown is that there is undulation in a linear tomographic feature connecting the interfering station and the interfered station, and thus, the interfering station and the interfered station are not visible to each other even though the undulation is less than 80 m. Also shown is that an interference wave arrives over mainly two edges.

As such, the locations of the interfering station and the interfered station are indicated in the map view and the profile view, and thus, a user can easily understand the positional relationship and the like of the radio stations.

Figure 16:
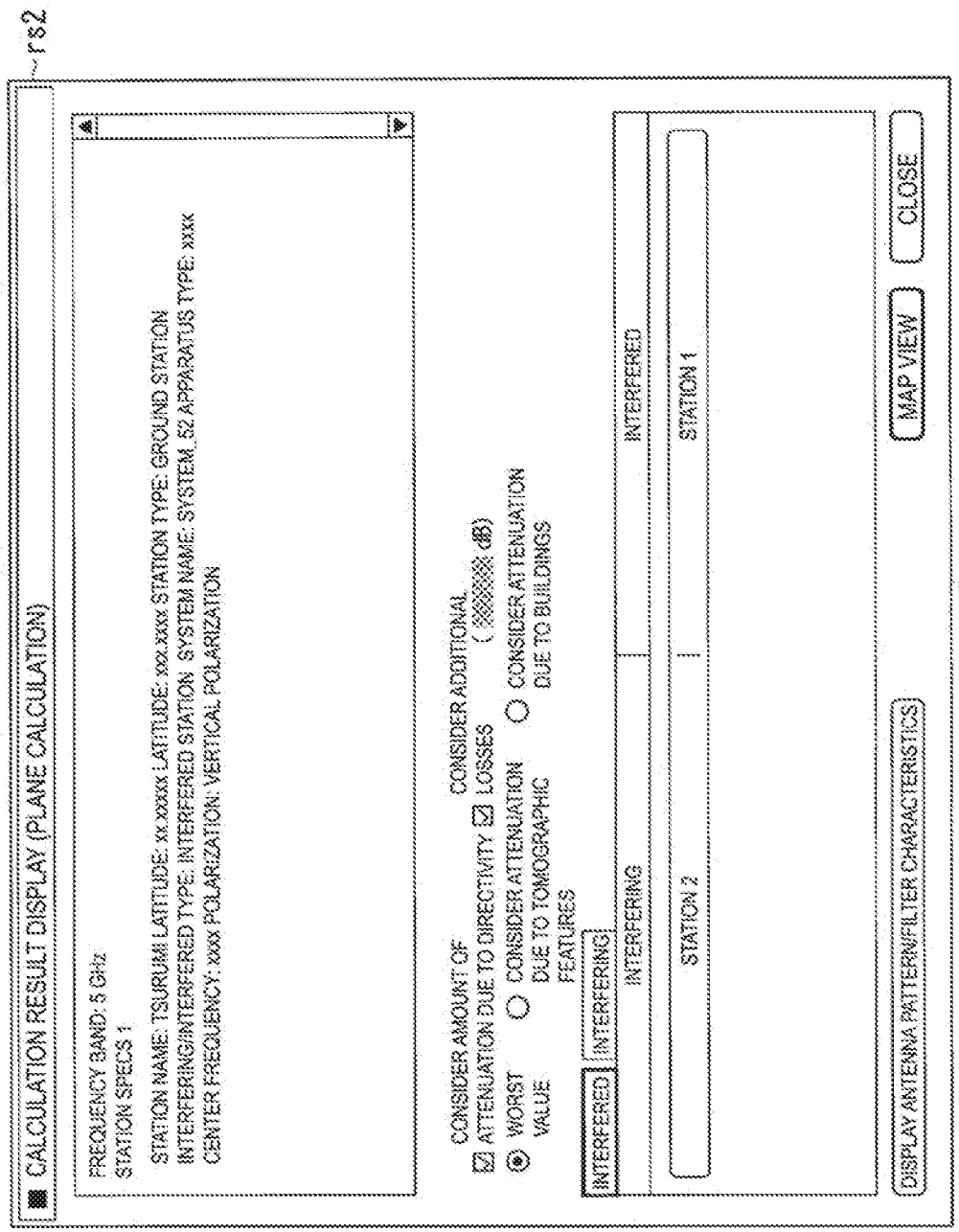
FIG. 16 is a schematic view illustrating an example of a calculation result screen displayed by the interference evaluation apparatus 1 according to the embodiment of the present invention.

FIG. 16 is a schematic view illustrating an example of a calculation result screen displayed by the interference evaluation apparatus 1 according to the embodiment of the present invention. FIG. 16 illustrates a calculation result display screen rs2 showing a calculation result of the interference calculation based on the plane calculation.

Note that the calculation result display screen rs2 illustrated in FIG. 16 is generated by the calculation result display designation unit 17, and is displayed by the display unit 302. The calculation result display designation unit 17 controls display of the result display screen rs2 by the display unit 302, based on the information input through the operation input unit 301.

The calculation result display screen rs2 illustrated in FIG. 16 shows a state where a calculation condition has been separately set and calculation has performed. The calculation result display screen rs2 shows selection items of display conditions for displaying a calculation result of the interference calculation. As illustrated in FIG. 16, a selection item for the conditions for displaying the calculation result of the interference calculation includes an item for selecting whether or not to consider the amount of attenuation due to directivity, and an item for selecting whether or not to consider additional losses.

As illustrated in FIG. 16, a selection item for the conditions for displaying the calculation result of the interference calculation further includes items for selecting whether or not to consider attenuation due to tomographic features, whether or not to consider attenuation due to buildings, or whether or not to set the worst value without considering both of the attenuation due to tomographic features and the attenuation due to buildings.

Note that the calculation result display screen rs2 illustrated in FIG. 16 shows a state where a condition is set that the amount of attenuation due to directivity and additional losses are taken into account to be reflected on the interference calculation, and the interference amount is calculated based on the plane calculation with the worst value which does not consider the attenuations due to tomographic features and buildings.

Figure 17:
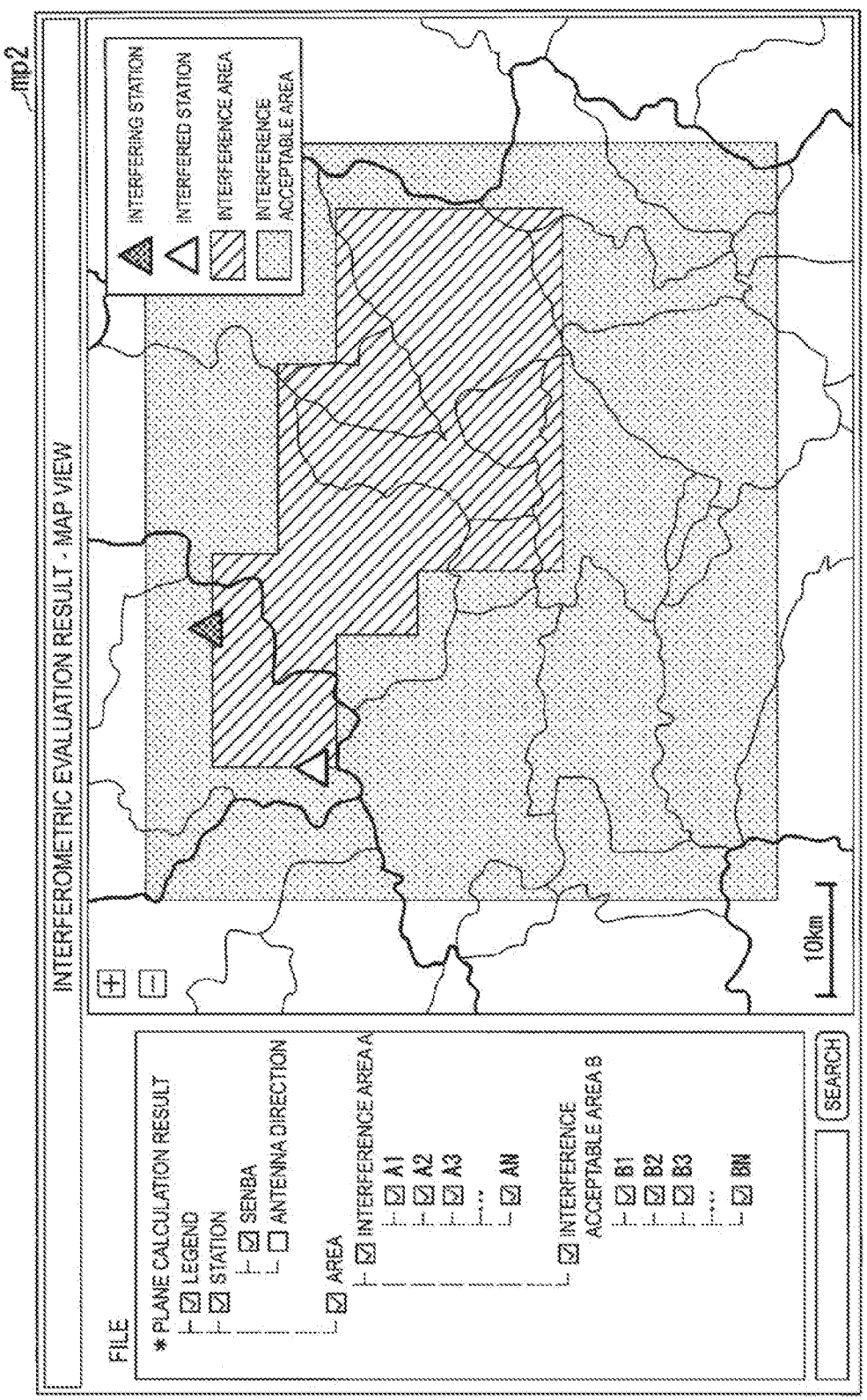
FIG. 17 is a schematic view illustrating an example of an interference evaluation result screen displayed by the interference evaluation apparatus 1 according to the embodiment of the present invention.

FIG. 17 is a schematic view illustrating an example of an interference evaluation result screen displayed by the interference evaluation apparatus 1 according to the embodiment of the present invention. FIG. 17 illustrates an interference evaluation result screen mp2 showing, on a map, a calculation result of the interference calculation based on the plane calculation.

Note that the interference evaluation result screen mp2 illustrated in FIG. 17 is generated by the calculation result diagram display unit 19, and is displayed by the display unit 302. The calculation result diagram display unit 19 controls display of the interference evaluation result screen mp2 by the display unit 302, based on the information input through the operation input unit 301.

In the interference evaluation result screen mp2, a range in which influence of the interference from an interfering station to an interfered station is not acceptable, and a range in which the influence is acceptable are shown on the map.

That is, the range in which the influence of the interference is not acceptable is represented as an "Interference area" on the map, and the range in which the influence of the interference is acceptable is represented as an interference acceptable area on the map.

In the map displayed on the interference evaluation result screen mp2, a location of the interfered station is indicated, and a directive antenna of the interfered station is directed in the southeast direction. Thus, in the map displayed on the interference evaluation result screen mp2, a range (interference area) to receive influence of the interference is spread from the interfered station in the southeast direction (the lower right direction in FIG. 17). An interfering station located on a boundary line between the interference area and the interference acceptable area is illustrated as an example.

In a Files field displayed on the left side of the map, items indicating the interfering station, the interfered station, the interference are, the interference acceptable area, and the like, which are displayed on the map of the interference evaluation result screen mp2, are each displayed in a tree view as a parts list. With this tree view, a user can switch whether or not to display each of the parts by selecting check boxes.

In the above, the explanation has been made that the calculation results of the interference calculation can be displayed in a profile view or on a map as in the interference evaluation result screen pf, the interference evaluation result screen mp, or the interference evaluation result screen mp2. Note that the following describes that the interference evaluation apparatus 1 can present, without recalculation, the influence of the interference (overall influence of the interference) on one interfered station from all of a plurality of interfering stations, based on the calculation results from the interference calculations between the interfering stations and the interfered station. This presentation is achieved by simply partially changing the setting contents for the execution conditions of the interference calculation set in the execution condition designation screen hp illustrated in FIG. 11, or the setting contents for the display of the calculation results set in the calculation result display screen and the calculation result display screen rp illustrated in FIG. 14, for example As described above, calculation conditions in the interference calculation are set in the execution condition designation screen hp illustrated in FIG. 11. The conditions of the interference calculation to be set in the execution condition designation screen hp will be described in further detail below.

As described above, the list of station information of the radio stations to be subjected to the interference evaluation is displayed on the upper part of the execution condition designation screen hp illustrated in FIG. 11. Note that in the execution condition designation screen hp illustrated in FIG. 11, four radio stations are selected, and the station information of these four radio stations is each displayed.

As illustrated, in the station information displayed on the top row of the list of station information of the radio stations to be subjected to the interference evaluation, a value for the item of "Interfering/Interfered" indicating the type of interference is "Interfering" showing an interfering station giving the interference, "Station name" is "Station 2", "Latitude 1" and "Longitude 1" indicating latitude and longitude of the location at which the radio station is installed are respectively "35.65X" and "139.84X", "System name" is "System_52", and "Antenna name" is "B". As illustrated, the station information displayed on the second row of the list of station information of the radio station to be subjected to the interference evaluation is highlighted. In the station information displayed on the second row of the list of station information of the radio stations to be subjected to the interference evaluation, "Interfering/Interfered" indicating the type of interference is "Interfering", "Station name" is "Station 3", "Latitude 1" and "Longitude 1" are respectively "35.58X" and "139.74X", "System name" is "System_52", and "Antenna name" is "B".

As illustrated, in the station information displayed on the third row of the list of station information of the radio stations to be subjected to the interference evaluation, a value for the item of "Interfering/Interfered" indicating the type of interference is "Interfered" showing an interfered station receiving the interference, "Station name" is "Station 1", "Latitude 1" and "Longitude 1" are respectively "35.46X" and "139.62X", "System name" is "System_52", and "Antenna name" is "A". As illustrated, in the station information displayed on the fourth row (lowermost row) of the list of station information of the radio stations to be subjected to the interference evaluation, "Interfering/Interfered" indicating the type of interference is "Interfered", "Station name" is "Station 1", "Latitude 1" and "Longitude 1" are respectively "35.39X" and "139.58X", "System name" is "System_51", and "Antenna name" is "A".

In the lower part of the execution condition designation screen hp illustrated in FIG. 11, calculation conditions in the interference calculation other than the station information are selected and designated. In the execution condition designation screen hp illustrated in FIG. 11, the interference calculation that takes into account attenuation due to tomographic features is designated to be performed with "Square root law+Ridge loss". That is, the interference amount is calculated with taking into account attenuation in accordance with tomographic features such as a mountain or a hill, in addition to attenuation of power in accordance with the distance in free space. The item of "Consider attenuation due to buildings" is not selected. The execution condition designation screen hp is set such as the additional losses having a designated numerical value (unit [dB]) may be considered.

As described above, in the execution condition designation screen hp illustrated in FIG. 11, a setting is made in which two interfering stations and two interfered stations are subjected to the interference evaluation. A user can change the target of the interference evaluation (for example, making three interfering stations and one interfered station be the target of the interference evaluation), for example, by simply making a partial setting change to this setting.

A case will be described below in which the interference calculation is performed with a setting in which only the type of the target station is changed from among the calculation conditions of the interference calculation set in the execution condition designation screen hp illustrated in FIG. 11.

Figure 18:
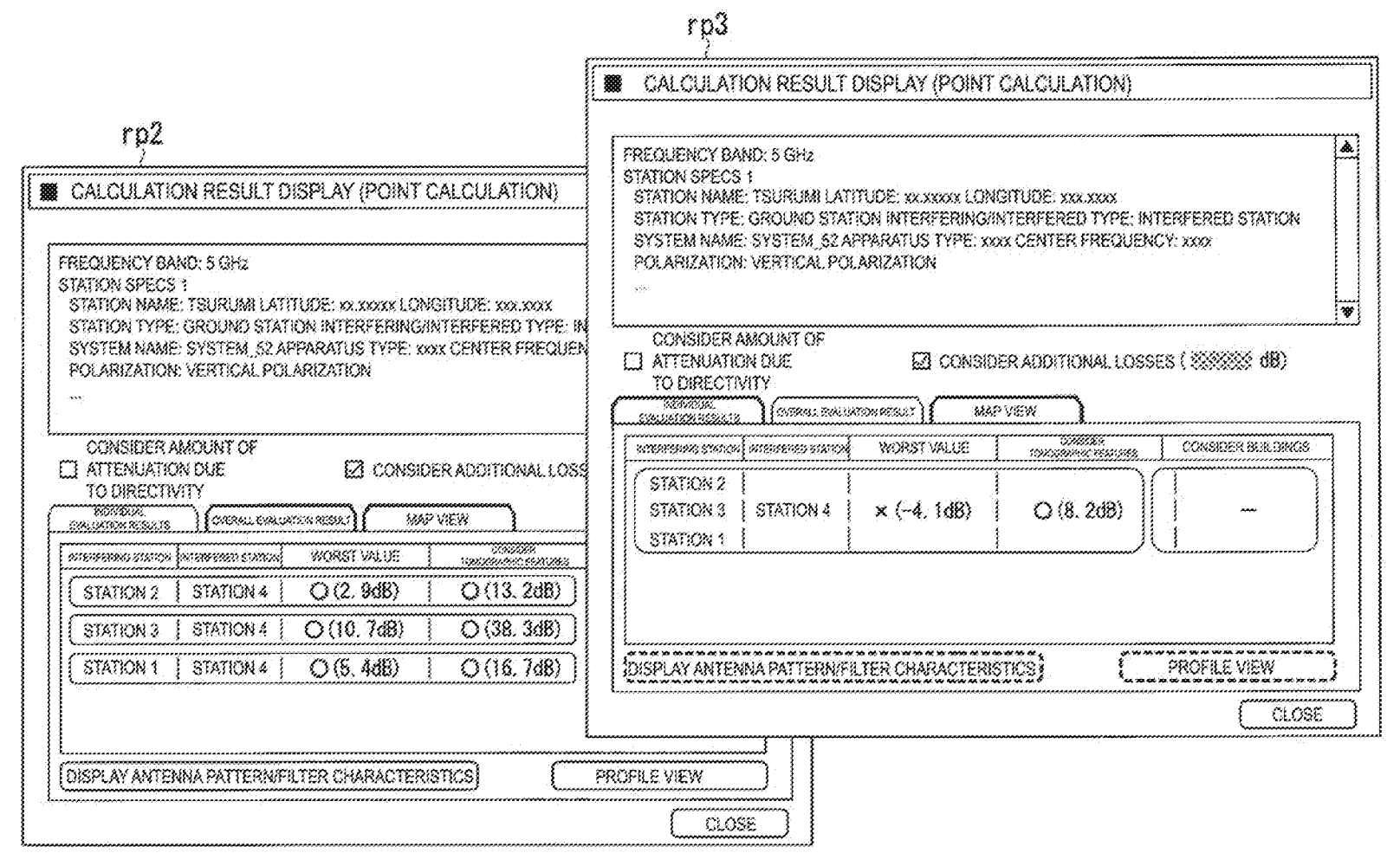

FIG. 18 is a schematic view illustrating an example of a calculation result display screen displayed by the interference evaluation apparatus 1 according to the embodiment of the present invention. FIG. 18 illustrates a calculation result display screen rp2 and a calculation result display screen rp3.

Note that the calculation result display screen rs2 and the calculation result display screen rs3 illustrated in FIG. 18 are generated by the calculation result display designation unit 17, and are displayed by the display unit 302. The calculation result display designation unit 17 controls display of the calculation result display screen rs2 and the calculation result display screen rs3 by the display unit 302, based on the information input through the operation input unit 301.

A calculation result of the interference calculation is provided on the lower part of the calculation result display screen rp2. As illustrated in FIG. 18, there are three tabs ("Individual evaluation results", "Overall evaluation result", and "Map view") on the lower part of the calculation result display screen rp2. In the calculation result display screen rp2 illustrated in FIG. 18, the "Individual evaluation results" tab is selected to display a list showing a combination of the interfering station and the interfered station to be subjected to the interference calculation, and a calculation result. As illustrated in FIG. 18, three calculation results are displayed in the list on the calculation result display screen rp2.

On the top row of the list shown in the calculation result display screen rp2, a calculation result is shown that in the combination of radio stations of the interfering station "Station 2" and the interfered station "Station 1", a calculation result with the worst value for which the antenna of the interfering station faces in the direction toward the interfered station is "o" (i.e., the result shows that the influence of the interference is within an acceptable range), and the amount of margin with respect to I/N required for acceptable interference (threshold value) is "2.9 dB". Also shown is a calculation result that a calculation result of the interference calculation in which tomographic features are taken into account is "o", and the amount of margin with respect to the I/N required for acceptable interference is "13.2 dB".

On the second row of the list shown in the calculation result display screen rp2, a calculation result is shown that in the combination of radio stations of the interfering station "Station 3" and the interfered station "Station 1", a calculation result with the worst value for which the antenna of the interfering station faces in the direction toward the interfered station is "o", and the amount of margin with respect to the I/N required for acceptable interference is "10.7 dB". Also shown is a calculation result that a calculation result of the interference calculation in which tomographic features are taken into account is "o", and the amount of margin with respect to the I/N required for acceptable interference is "38.3 dB".

On the third row of the list shown in the calculation result display screen rp2, a calculation result is shown that in the combination of radio stations of the interfering station "Station 1" and the interfered station "Station 1", a calculation result with the worst value for which the antenna of the interfering station faces in the direction toward the interfered station is "o", and the amount of margin with respect to the I/N required for acceptable interference is "5.4 dB". Also shown is a calculation result that a calculation result of the interference calculation in which tomographic features are taken into account is "o", and the amount of margin with respect to the I/N required for acceptable interference is "16.7 dB".

Thus, if the "Individual evaluation results" tab is selected in the calculation result display screen rp2, the calculation results of the interference calculations in combinations of one interfering station and the plurality of (three) interfered stations are shown.

Here, a screen in a case where the "Overall evaluation result" tab is selected in the calculation result display screen rp2 is the calculation result display screen rp3 illustrated in FIG. 18. In the calculation result display screen rp3, an overall evaluation result is shown in which all of the calculation results of the evaluation calculations in the above-described three sets of combinations of the interfering station and the interfered station (i.e., the combinations of "Station 2" and "Station 4", "Station 3" and "Station 4", and "Station 1" and "Station 4") are summarized.

As illustrated in FIG. 18, in the calculation result display screen rp3, an overall evaluation result is shown where the interfering station includes "Station 2", "Station 3", and "Station 1", and the interfered station includes "Station 1". This overall evaluation result shows a calculation result that a calculation result with the worst value is "x", and the amount of margin with respect to the I/N required for acceptable interference is "−4.1 dB" which is a minus value. This overall evaluation result also shows a calculation result that a calculation result of the interference calculation in which tomographic features are taken into account is "o", and the amount of margin with respect to the I/N required for acceptable interference is "8.2 dB".

Thus, even though all of the individual calculation results are "o" (i.e., the results show that the influence of the interference is within an acceptable range) when the interference calculation are individually performed in the combinations of the plurality of interfering stations and the interfered station, when the influence of the interference from all of the plurality of interfering stations to one interfered station is summarized, the calculation result of the interference calculation may show "x" (i.e., the result may show that the influence of the interference is not within an acceptable range).

Figure 24:
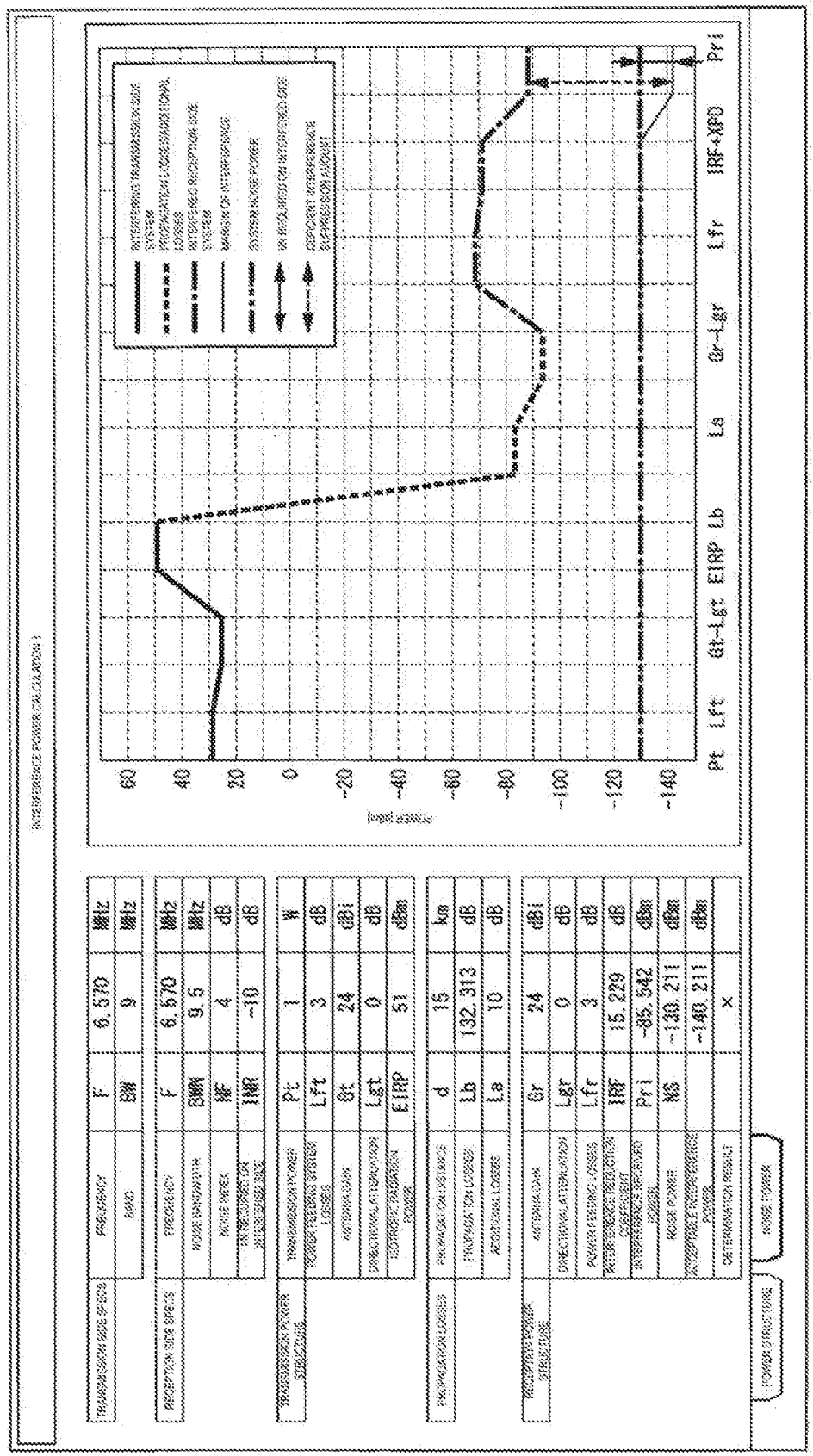
FIG. 24 is a diagram illustrating an example of an interference calculation screen utilizing general spreadsheet software.
Figure 25:
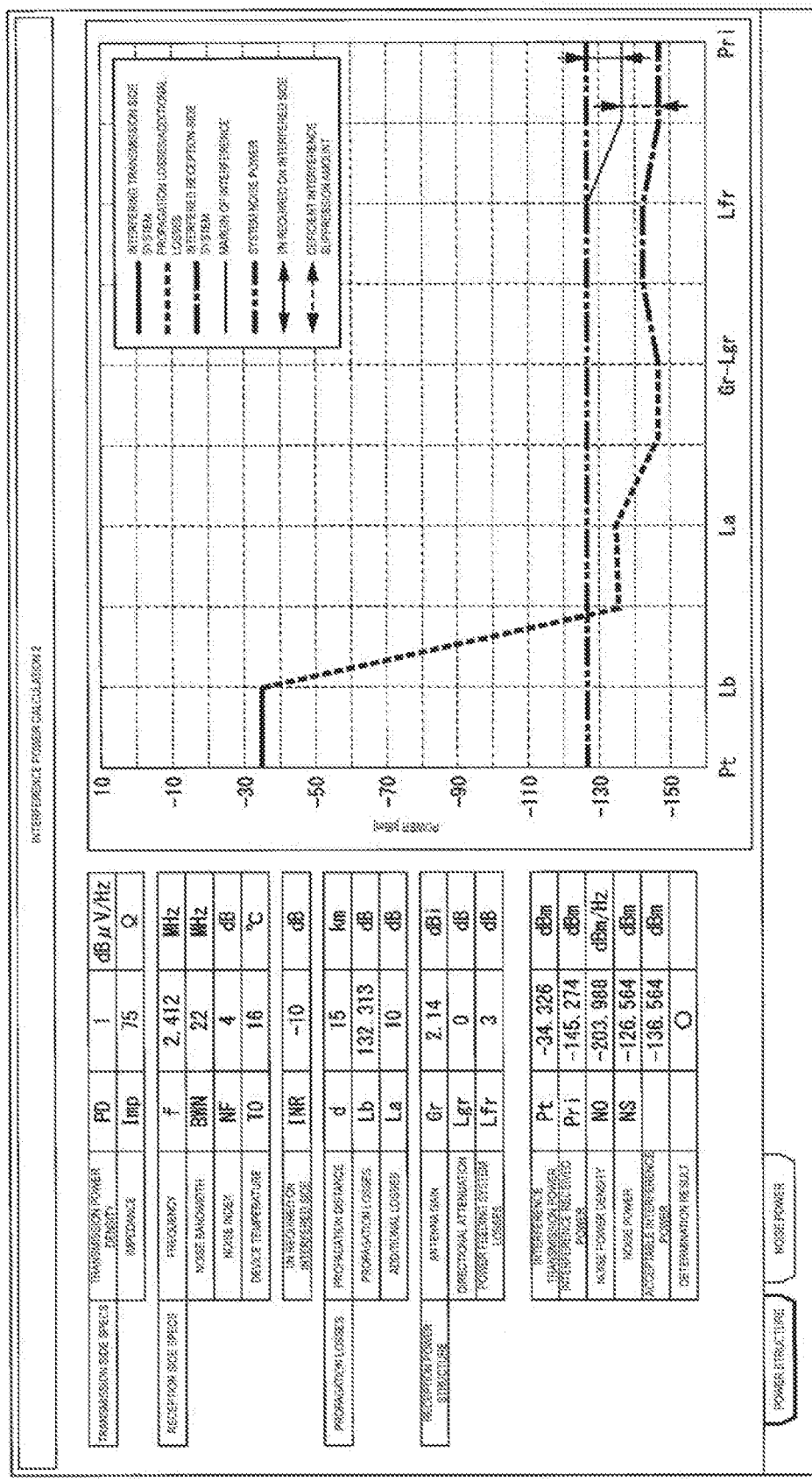
FIG. 25 is a diagram illustrating another example of the interference calculation screen utilizing general spreadsheet software.

When the interference calculation that takes into account the influence by the plurality of interfering stations, which may result in such a calculation result, is performed by using conventional general spreadsheet software (such as the one described with reference to FIGS. 24 and 25 at the beginning), operations are complicated and the work burden on a user is large. This example shows three sets of combinations of interfering and interfered stations, including three interfering stations and one interfered station. However, in an example where both of the interfering and interfered stations each include 10 stations, there are a total of 100 combinations, and thus, using a conventional interference examination method results in complicated and huge amount of work.

On the other hand, according to the interference evaluation apparatus 1 described above, a user can set the calculation conditions of the interference calculation in the execution condition designation screen hp illustrated in FIG. 11, and simply select the "Overall evaluation result" tab as in the calculation result display screen rp3 illustrated in FIG. 18 to refer to the calculation of the interference evaluation without performing complicated operations. In the calculation result display screen rp3, a user can easily understand whether or not the amount of margin with respect to the I/N required for acceptable interference is a positive value, and a numerical value for the amount of margin.

As such, in the calculation result display screen rp3 illustrated in FIG. 18, the evaluation result for the influence of the interference from the individual interfering stations to the interfered station, and the evaluation result for the influence of the interference from the plurality of interfering stations to the interfered station are respectively displayed by simply switching the "Individual evaluation results" tag and the "Overall evaluation result" tag. This facilitates the comparison of the plurality of interfering stations and the consideration of whether or not the influence of the interference can be avoided by excluding a certain interfering station, to avoid the influence of the interference.

As described above, if the plurality of interfering stations are to be evaluated, the interference evaluation apparatus 1 individually performs an interference calculations of the number of combinations of the plurality of interfering stations and the interfered station at the same time. Further, the interference evaluation apparatus 1 summarizes the plurality of calculation results obtained by individually performing the interference calculations. to calculate the influence of the interference on the same interfered station from the plurality of interfering stations. The interference evaluation apparatus 1 displays the "Individual evaluation results" and the "Overall evaluation result" to be switchable by tabs, and thus, a user can easily refer to each of the evaluation results.

Note that, for example, the executions of the interference calculation for determining the "Individual evaluation results" displayed on the calculation result display screen rp2, and the interference calculation for determining the "Overall evaluation result" displayed on the calculation result display screen rp3 are started when an "Execute calculation" button arranged on the execution condition designation screen is depressed. Thus, at the time point when the calculation result display screen rp2 or the calculation result display screen rp3 illustrated in FIG. 18 is displayed, the "Individual evaluation results" and the "Overall evaluation result" are already obtained.

Figure 19:
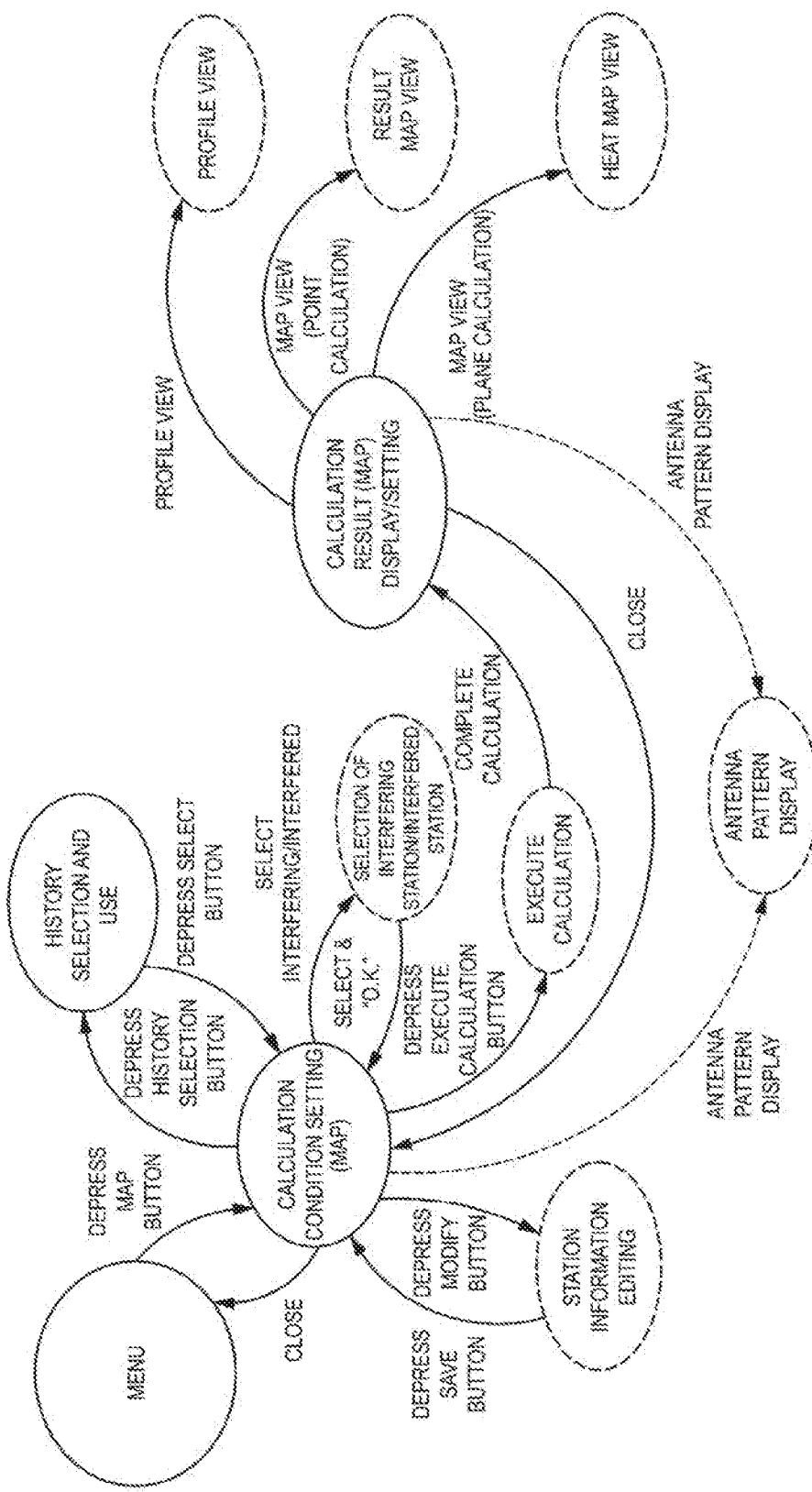
FIG. 19 is a screen transition diagram illustrating transition of a screen displayed by the interference evaluation apparatus 1 according to the embodiment of the present invention.

Screen transition related to the map-based interference evaluation will be described below. FIG. 19 is a screen transition diagram illustrating transition of a screen displayed by the interference evaluation apparatus 1 according to the embodiment of the present invention. The screen transition diagram illustrated in FIG. 19 represents states of screen transition in the map-based interference evaluation (i.e., interference evaluation in a case where at least one of the location of the interfering station and the location of the interfered station is known).

In the screen transition diagram illustrated in FIG. 19, a state in which primary screens are displayed is indicated by the solid-line enclosure. As illustrated, the primary screens include a "Menu" screen, a "Calculation condition setting (map)" screen, a "History selection and use" screen, and a "Calculation result (map) display/setting" screen.

The "Menu" screen referred here corresponds to the main menu screen m illustrated in FIG. 3. The "Calculation condition setting (map)" screen referred here corresponds to the execution condition designation screen h1 illustrated in FIG. 8, the execution condition designation screen hp illustrated in FIG. 11, the execution condition designation screen hs illustrated in FIG. 12, and the execution condition designation screen ha illustrated in FIG. 13. The "History selection and use" screen referred here corresponds to the history selection screen h2 illustrated in FIG. 9. The "Calculation result (map) display/setting" screen referred here corresponds to the calculation result display screen rp and the calculation result display screen rs illustrated in FIG. 14, and the calculation result display screen rp2 and the calculation result display screen rp3 illustrated in FIG. 18.

In the screen transition diagram illustrated in FIG. 19, a state in which screens other than the above-described primary screens (hereinafter, referred to as "sub-screens") are displayed is indicated by the broken-line enclosure. As illustrated, the sub-screens include a "Station information editing" screen, a "Selection of interfering station/interfered station" screen, an "Execute calculation" screen, an "Antenna pattern display" screen, a "Profile view" screen, a "Result map view" screen, and a "Heat map view" screen.

The "Station information editing" screen referred here corresponds to the station DB editing screen se illustrated in FIG. 6. The "Selection of interfering station/interfered station" screen referred here corresponds to the station selection screen ss illustrated in FIG. 10. The "Profile view" screen referred here corresponds to the interference evaluation result screen pf illustrated in FIG. 15. The "Result map view" screen referred here corresponds to the interference evaluation result screen mp illustrated in FIG. 15. The "Heat map view" screen referred here corresponds to the interference evaluation result screen mp2 illustrated in FIG. 17. Note that the "Execute calculation" screen is a screen showing a state in which the interference calculation is being executed, and the "Antenna pattern display" screen is a screen displaying the antenna pattern. Description for details of the screens will be omitted.

Note that in the screen transition diagram illustrated in FIG. 19, a description added to an arrow indicating transition between screen states indicates an example of a method of instructing transition on a transition original screen, indicating a name of a button to be depressed, for example As illustrated in the screen transition diagram illustrated in FIG. 19, the screen can transit to the "Station information editing" screen and the "Selection of interfering station/interfered station" screen from the "Calculation setting condition (map)" screen. This allows the user to edit the station information of the radio stations related to the interference evaluation, or select an interfering station or interfered station used for the interference calculation to read out the station information, from the "Calculation settings condition (map)" screen.

The screen transits from the "Calculation condition setting (map)" screen to the "Execute calculation" screen, after all of the execution conditions of the interference calculation are set, and the "Execute calculation" button arranged on the execution condition designation screen h1 illustrated in FIG. 8, the execution condition designation screen hp illustrated in FIG. 11, the execution condition designation screen hs illustrated in FIG. 12, or the execution condition designation screen ha illustrated in FIG. 13 is depressed.

The screen can transit to the "Profile view" screen, the "Result map view" screen, and the "Heat map view" screen from the "Calculation result (map) display/setting" screen. This allows the user to select a desired display method on the "Calculation result (map) display/setting" screen to refer to the calculation results of the interference calculation.

The screen can transit to the "Antenna pattern display" screen from both of the "Calculation condition setting (map)" screen and the "Calculation result (map) display/setting" screen. This allows the user to check the antenna pattern before and after executing the interference calculation.

Figure 20:
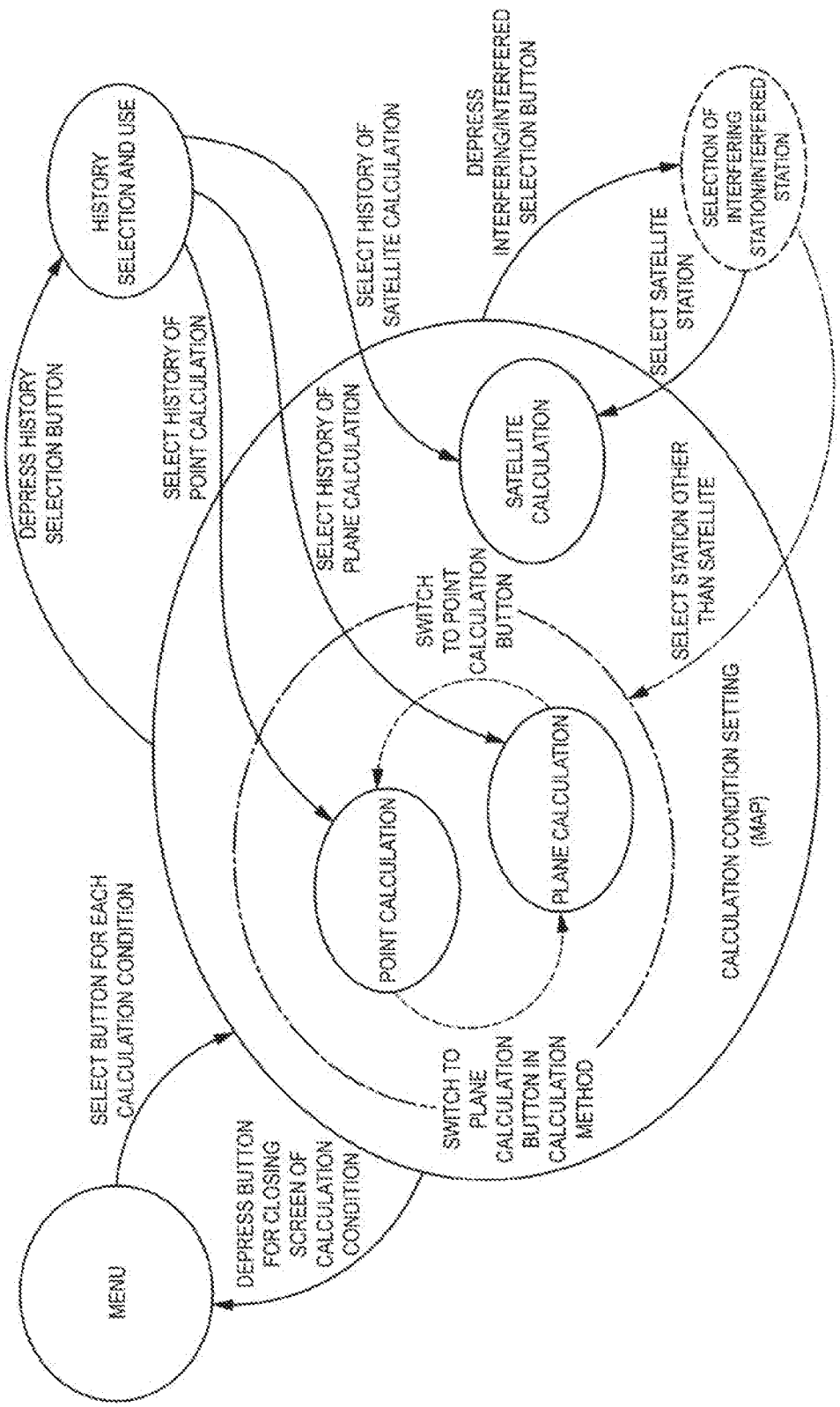
FIG. 20 is a screen transition diagram illustrating transition of a screen displayed by the interference evaluation apparatus 1 according to the embodiment of the present invention.

Screen transition in setting the execution conditions of the interference calculation in a case of history selection in the interference evaluation will be described below. FIG. 20 is a screen transition diagram illustrating transition of a screen displayed by the interference evaluation apparatus 1 according to the embodiment of the present invention.

In the above, as a screed corresponding to the "Calculation condition setting (map)" screen, the execution condition designation screen hp for designating the execution conditions of the point-to-point calculation illustrated in FIG. 11, the execution condition designation screen hs for designating the execution conditions of the plane calculation illustrated in FIG. 12, and the execution condition designation screen ha for designating the execution conditions of the interference calculation between satellite and ground station illustrated in FIG. 13 are described. The control unit 10 of the interference evaluation apparatus 1 automatically determines an execution condition designation screen to which a screen transits out of these three execution condition designation screens.

Specifically, from among the radio buttons arranged on the uppermost part of the execution condition designation screen hp illustrated in FIG. 11 and the execution condition designation screen hs illustrated in FIG. 12, if the "Point calculation" is selected, the screen automatically transits to the execution condition designation screen hp, and if the "Plane calculation" is selected, the screen automatically transits to the execution condition designation screen hs. In the station selection screen ss illustrated in FIG. 10, if a satellite station is set to either one of the interfering station or the interfered station, the screen automatically transits to the execution condition designation screen ha illustrated in FIG. 13.

In addition to the above, in the history selection screen h2 illustrated in FIG. 9, if a history folder of "Point calculation" is selected, the screen automatically transits to the execution condition designation screen hp, and if a history folder of "Plane calculation" is selected, the screen automatically transits to the execution condition designation screen hs, and if a history folder of "Satellite calculation" is selected, the screen automatically transits to the execution condition designation screen ha.

Note that in a case where the satellite station is already set to either one of the interfering station or the interfered station, even though a radio station other than the satellite (such as a ground station) is additionally selected on the station selection screen ss illustrated in FIG. 10, the satellite station is already set, and thus, the screen transits back to the execution condition designation screen ha for designating the execution conditions of the interference calculation between satellite and ground station illustrated in FIG. 13.

Model-Based Interference Evaluation

Model-based interference evaluation will be described below.

Figure 21:
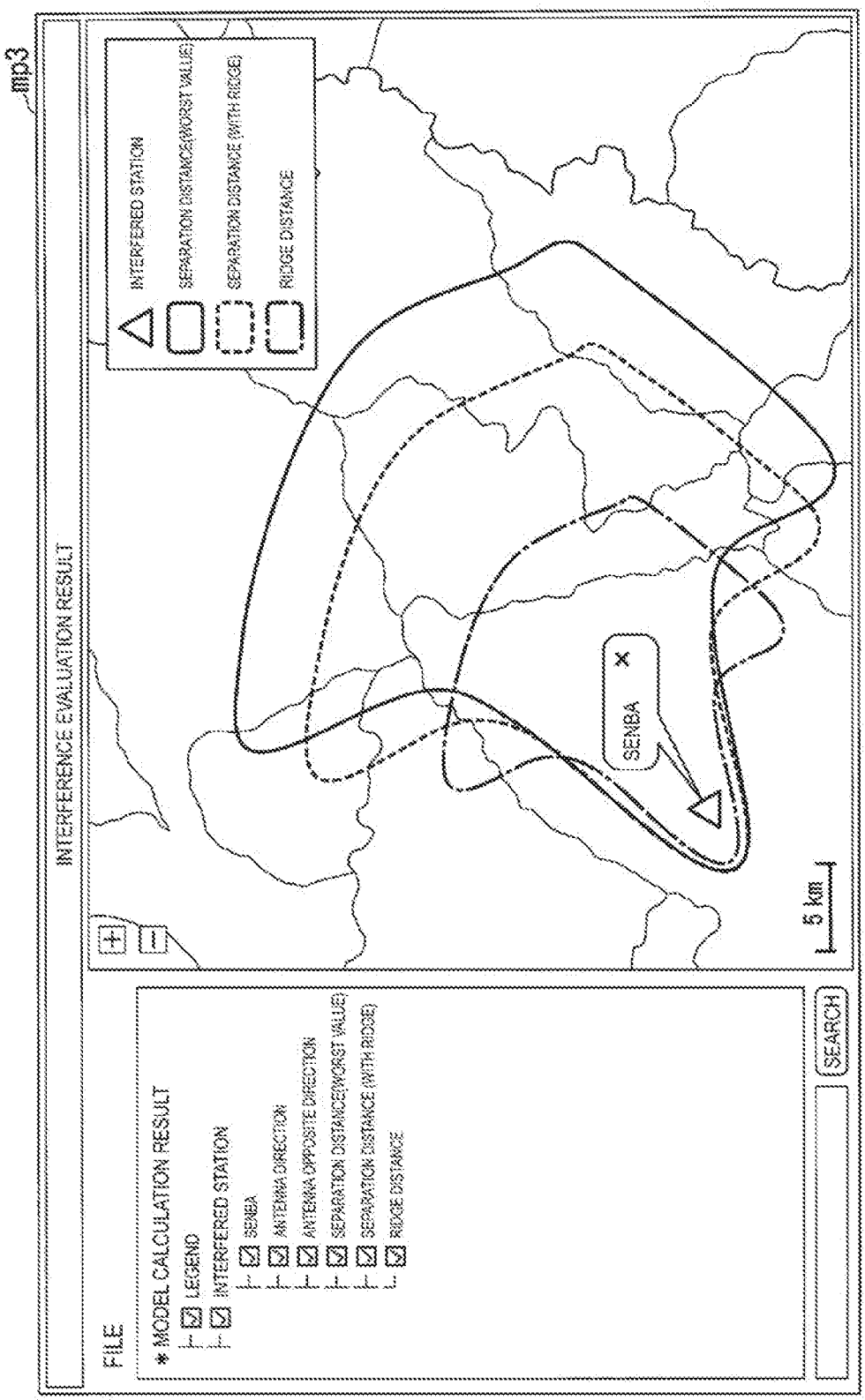
FIG. 21 is a schematic view illustrating an example of an interference evaluation result screen displayed by the interference evaluation apparatus 1 according to the embodiment of the present invention.

FIG. 21 is a schematic view illustrating an example of an interference evaluation result screen displayed by the interference evaluation apparatus 1 according to the embodiment of the present invention. FIG. 21 illustrates an interference evaluation result screen mp3 showing, on a map, a calculation result of the interference calculation (second interference calculation) based on the model-based interference evaluation.

Note that the interference evaluation result screen mp3 illustrated in FIG. 21 is generated by the calculation result diagram display unit 19, and is displayed by the display unit 302. The calculation result diagram display unit 19 controls display of the interference evaluation result screen mp3 by the display unit 302, based on the information input through the operation input unit 301.

An interfered station, a separation distance, and a ridge distance are illustrated on a map of the interference evaluation result screen mp3 illustrated in FIG. 21. For the separation distance, a separation distance determined with the worst value and a separation distance determined under the calculation conditions with ridges are respectively shown. The separation distance determined under the calculation conditions with ridges is a separation distance that takes into account the shielding of view from the interfered station based on tomographic features on the map. The separation distance determined with the worst value is a separation distance calculated under the calculation conditions not taking into account ridges due to such tomographic features.

The ridge distance indicates a location of the ridge in a case where a separation distance is determined under the calculation conditions with ridges. On the map of the interference evaluation result screen mp3 illustrated in FIG. 21, the ridge distance represents a distance that is half the separation distance determined with the worst value (distance from the interfered station). Note that the separation distance referred here indicates the distance required for the interfered station to not receive the influence of the interference.

As such, in addition to displaying, on the map, a calculation result of the interference calculation based on the above-described map-based interference evaluation, the interference evaluation apparatus 1 can display, using a map as well as texts, a calculation result of the interference calculation based on the model-based interference evaluation.

Figure 22:
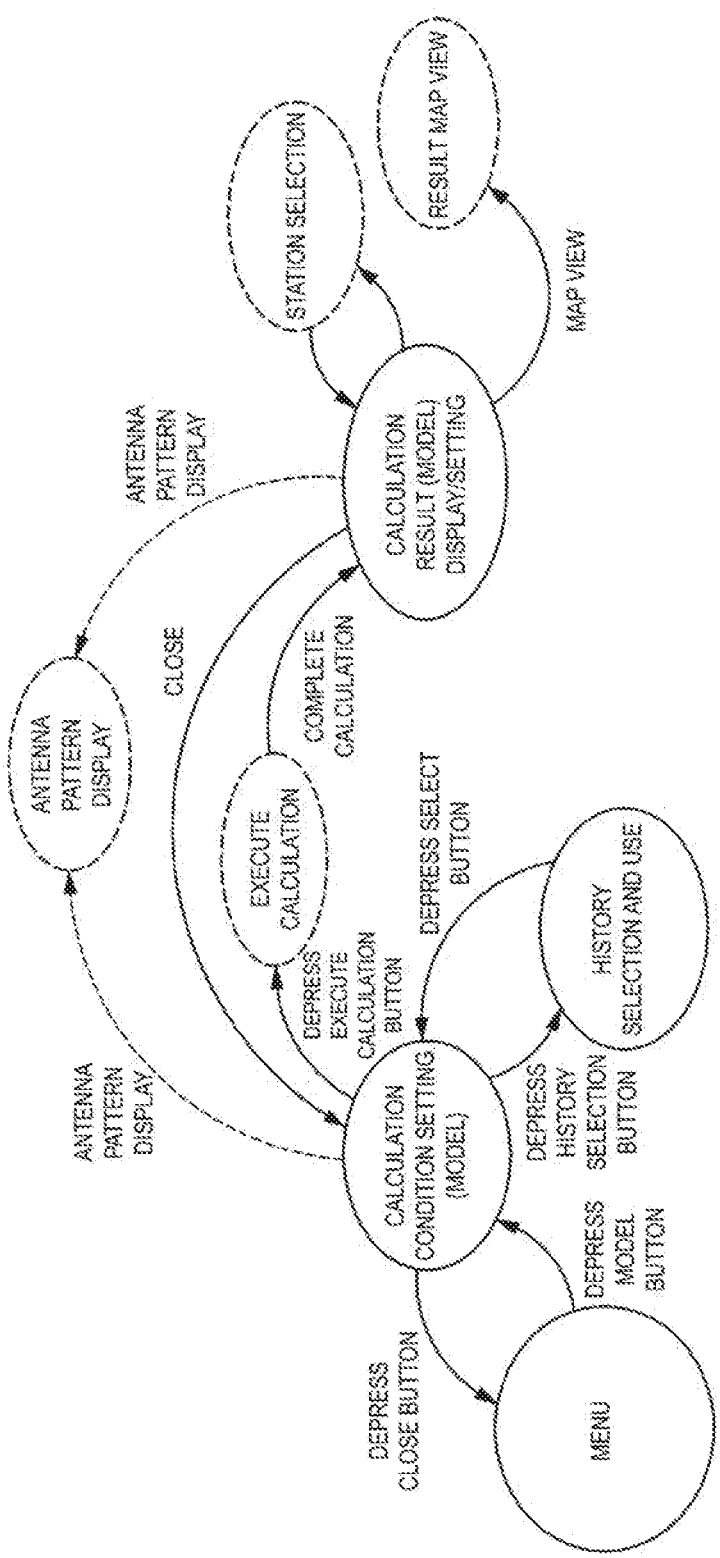
FIG. 22 is a screen transition diagram illustrating transition of a screen displayed by the interference evaluation apparatus 1 according to the embodiment of the present invention.

Screen transition for the model-based interference evaluation will be described below. FIG. 22 is a screen transition diagram illustrating transition of a screen displayed by the interference evaluation apparatus 1 according to the embodiment of the present invention. The screen transition diagram illustrated in FIG. 22 represents states of screen transition in the model-based interference evaluation (i.e., interference evaluation in a case where both of the location of the interfering station and the location of the interfered station are indefinite).

In the screen transition diagram illustrated in FIG. 22, a state in which primary screens are displayed is indicated by the solid-line enclosure. As illustrated, the primary screens include a "Menu" screen, a "Calculation condition setting (model)" screen, a "History selection and use" screen, and a "Calculation result (model) display/setting" screen. The "Menu" screen referred here corresponds to the main menu screen m illustrated in FIG. 3. The "History selection and use" screen referred here corresponds to the history selection screen h2 illustrated in FIG. 9.

In the screen transition diagram illustrated in FIG. 22, a state in which sub-screens are displayed is indicated by the broken-line enclosure. As illustrated, the sub-screens include an "Execute calculation" screen, an "Antenna pattern display" screen, a "Result map view" screen, and a "Station selection" screen. The "Result map view" screen referred here corresponds to the interference evaluation result screen mp3 illustrated in FIG. 21.

Note that in the screen transition diagram illustrated in FIG. 22, a description added to an arrow indicating transition between screen states indicates an example of a method of instructing transition on a transition original screen, indicating a name of a button to be depressed, for example As illustrated in FIG. 22, as with the map-based interference evaluation, the screen can transit to the "History selection and use" screen from the "Calculation condition setting (model)" screen, also in the model-based interference evaluation. As with the map-based interference evaluation, the screen transits to the "Calculation result (model) display/ setting" screen via the "Execute calculation" screen after all of the execution conditions of the interference calculation are set in the "Calculation condition setting (model)" screen and the "Execute calculation" button is depressed.

As illustrated in FIG. 22, as with the map-based interference evaluation, the screen transits to the "Antenna pattern display" screen from both of the "Calculation condition setting (model)" screen and the "Calculation result (model) display/setting" screen. Here, a point different from the map-based interference evaluation is that the screen can transits to the "Station selection" screen from the "Calculation result (model) display/setting" screen. As a result, the calculation result is projected on the map such that a range of the influence of the interference is shown as a specific location even in the interference calculation based on the model-based interference evaluation, and thus, a user can visually recognize the influence of the interference.

Figure 23:
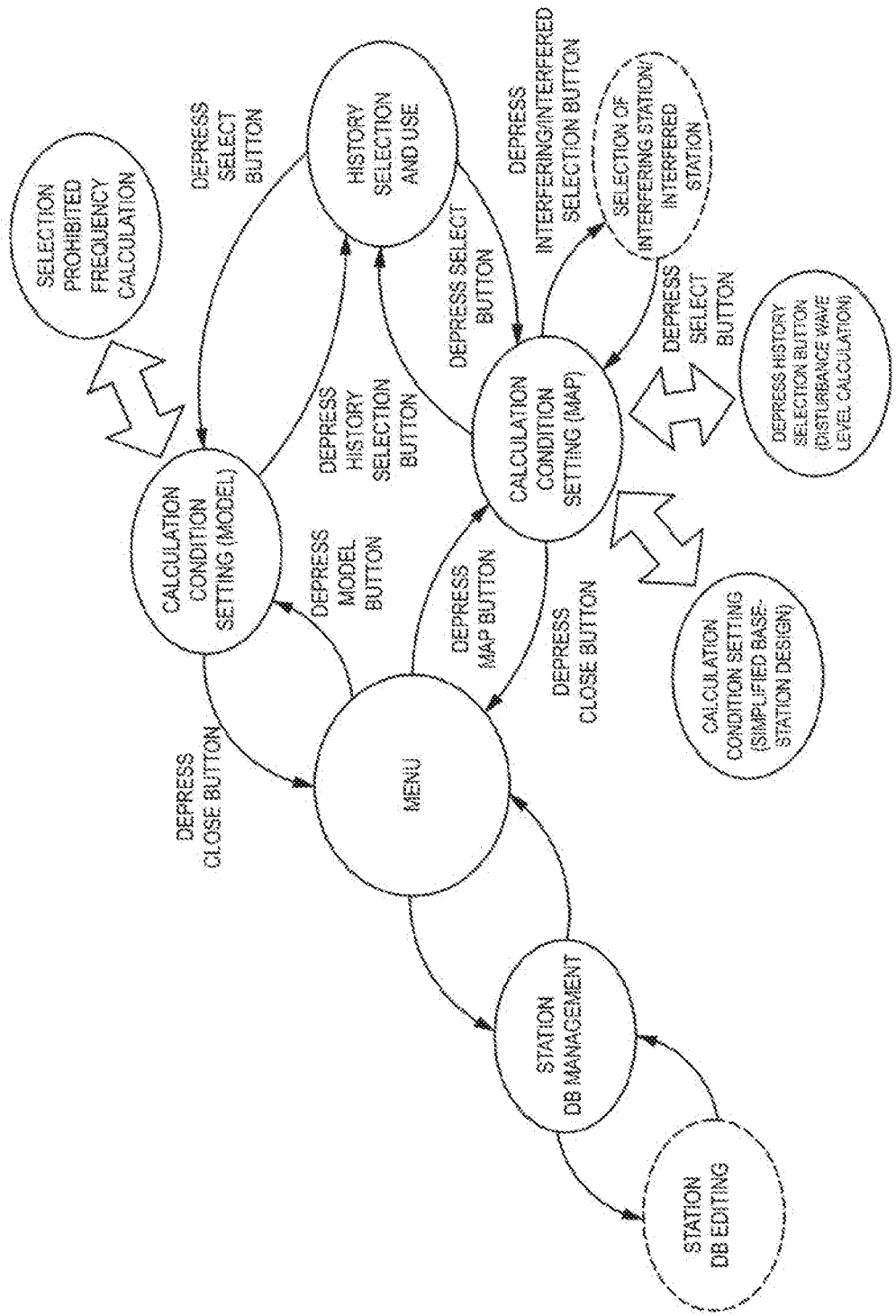
FIG. 23 is a screen transition diagram illustrating transition of a screen displayed by the interference evaluation apparatus 1 according to the embodiment of the present invention.

Screen transition for history selection and use will be described below. FIG. 23 is a screen transition diagram illustrating transition of a screen displayed by the interference evaluation apparatus 1 according to the embodiment of the present invention.

Note that in the screen transition diagram illustrated in FIG. 23, description is omitted for the transition from the "Calculation condition setting (map)" screen and the "Calculation condition setting (model)" screen to the "Execute calculation" screen or the "Calculation result display" screen. As a reference, the transition from the "Menu" screen to the "Station DB management" screen and the "Station DB editing" screen is also illustrated. Note that the "Station DB management" screen referred here corresponds to the station DB management screen sm illustrated in FIG. 5. The "Station DB editing" screen referred here corresponds to the station DB management screen se illustrated in FIG. 6.

As illustrated in FIG. 23, the screen can transit from the "Menu" screen to both the "Calculation condition setting (map)" screen and the "Calculation condition setting (model)" screen. Note that the "Calculation condition setting (map)" screen is a screen for setting the execution conditions of the interference calculation based on the map-based interference evaluation using detailed information of the interfering station and the interfered station. The "Calculation condition setting (model)" screen is a screen for setting the execution conditions of the interference calculation based on the model-based interference evaluation not requiring detailed information of the interfering station and the interfered station.

Note that the screen transits to a "Calculation condition setting (simplified base-station design)" screen and a "Calculation condition setting (disturbance wave level calculation)" screen by depressing an appropriate button in the "Menu" screen. The "Calculation condition setting (simplified base-station design)" screen is a screen for setting the calculation conditions in the simplified base-station design using information indicating the locations of the interfering station and the interfered station as with the map-based interference evaluation. The "Calculation condition setting (disturbance wave level calculation)" screen is a screen for calculating disturbance wave level.

The screen can transit to the "Selection of interfering station/interfered station" screen from the "Calculation condition setting (map)" screen, the "Calculation condition setting (simplified base-station design)" screen, and the "Calculation condition setting (disturbance wave level calculation)" screen. Here, when a radio station to be subjected to the interference evaluation is set, the screen transits back to the "Calculation condition setting (map)" screen.

The screen transits to the "Calculation condition setting (model)" screen, which is a screen for setting the execution conditions of the interference calculation based on the model-based interference evaluation not requiring detailed information of the interfering station and the interfered station, by depressing an appropriate button in the "Menu" screen.

The screen can transit to the "History selection and use" screen from both the "Calculation condition setting (map)" screen and the "Calculation condition setting (model)" screen to which the screen can transit from the "Menu" screen as described above. For example, the screen transits to the history selection screen h2 illustrated in FIG. 9 by depressing the "History selection" button arranged in the execution condition designation screen h1 illustrated in FIG. 8, the execution condition designation screen hp illustrated in FIG. 11, the execution condition designation screen hs illustrated in FIG. 12, or the execution condition designation screen ha shown in FIG. 13.

The history storage unit 202 referenced by the "History selection and use" screen stores history folders including the history of the interference evaluations performed in the past. From these history folders, similar execution conditions of the interference calculation in the past can be read to be utilized as an execution condition of the interference calculation, for example. At this time, a history information folder including an execution condition different from the already set execution condition can also be selected. For example, even when the screen transits to the "History selection and use" screen from the "Calculation condition setting (map)" screen for setting calculation conditions for the map-based interference evaluation, if a history folder of the model-based interference calculation is selected, then the screen transits to the "Calculation condition setting (model)" screen different from the transition original screen.

As such, the interference evaluation menu provided by the interference evaluation apparatus 1 includes the map-based interference evaluation, the model-based interference evaluation, and the simplified base-station design, and the station information required for all of the interference evaluations can be selected and utilized from the station DB 201 in common. Various parameters used in the interference examinations are input and registered in the station DB editing screen se illustrated in FIG. 6, but not all of these registered parameters are always used in all types of the interference evaluations.

However, some of the parameters (common parameters) are commonly used in all of the interference evaluations, and the other of the parameters (individual parameters) are used only in specific interference evaluations. The interference evaluation apparatus 1 manages the common parameters and the individual parameters together by the station DB 201, and thus, necessary station information can be read out from the station DB 201 in each of different types of interference evaluations provided as a selection menu. As such, the availability of acquiring necessary station information from the station DB 201 in common provides a profound effect in facilitating the interference evaluation. This is because in the interference evaluation, information such as design specifications and installation conditions of a radio station to be subjected to the interference evaluation is collected, and the interference calculations are performed based on the collected various information.

An embodiment of the present invention has been described above in detail with reference to the drawings, but the specific configuration is not limited to this embodiment, and designs that do not depart from the gist of the present invention are also included.

All or a part of the interference evaluation apparatus 1 according to the above-described embodiment may be realized by a computer. This may be realized by recording a program for realizing this function in a computer readable recording medium and causing a computer system to read and execute the program recorded on this recording medium. Note that the "computer system" referred here includes an OS, hardware such as peripheral devices. The "computer readable recording medium" refers to a storage device including a portable medium such as a flexible disk, a magneto-optical disk, a ROM, and a CD-ROM, and a hard disk built into a computer system. The "computer readable recording medium" may also include a medium that dynamically stores a program for a short period of time, for example, a communication line for transmitting a program via a network such as the Internet or a communication channel such as a telephone line, and a medium that stores a program for a certain period of time, for example, a volatile memory in a computer system serving as a server or a client in the case of the transmission. The above-described program may also be a program that achieves some of the functions described above, or that achieves the functions described above in combination with a program already recorded in the computer system, or that achieves the functions described above by using a programmable logic device such as a field programmable gate array (FPGA).

REFERENCE SIGNS LIST

1 Interference evaluation apparatus
10 Control unit
11 Input setting/selection/registration change instruction unit
12 Interferometry (menu) selection unit
13 Station information input/registration unit
14 Interfering/interfered station selection unit
15 History selection unit
16 Calculation condition setting unit
17 Calculation result display designation unit
18 Interference power calculation and acceptance/rejection determination unit
19 Calculation result diagram display unit
20 Storage unit
30 Input/output unit
201 Station DB
202 History storage unit
203 Map information DB
301 Operation input unit
302 Display unit

The invention claimed is:

1. An interference evaluation apparatus, comprising:
a storage medium configured to store computer program instructions, interfering station information and interfered station information, the interfering station information indicating a first usage frequency, a first bandwidth, and a first filter characteristic with respect to an interfering station causing radio interference in radio communication, the interfered station information indicating a second usage frequency, a second bandwidth, and a second filter characteristic with respect to an interfered station receiving the radio interference; and
a processor configured to execute the computer program instructions so as to:
perform an interference calculation for calculating an interference power based on the interfering station information and the interfered station information and in consideration of the first and second usage frequencies, the first and second bandwidths, and the first and second filter characteristics with respect to the interfering station and the interfered station, respectively; and
determine whether the interfering station and the interfered station are usable together based on the calculated interference power and an acceptable interference power in the interfered station.

2. The interference evaluation apparatus according to claim 1,
wherein the storage medium is further configured to store history information indicating a calculation condition used in a previously performed interference calculation, and the calculation condition includes an evaluation method for the radio interference and an execution condition of the interference calculation; and
the processor is configured to perform the interference calculation based on the history information.

3. The interference evaluation apparatus according to claim 1,
wherein the processor is further configured to:
generate a list of the interfering station information and the interfered station information,
receive information indicating an instruction for selecting at least one of the interfering station information and the interfered station information used in the interference calculation from the list; and
receive information indicating an instruction for narrowing the list based on a designated range of a center frequency or a frequency band.

4. The interference evaluation apparatus according to claim 1,
wherein the interference calculation includes a first interference calculation and a second interference calculation,
the processor is configured to perform the first interference calculation by using at least one of information indicating a location of the interfering station or information indicating a location of the interfered station,
the processor is configured to perform the second interference calculation by not using the information indicating the location of the interfering station and the information indicating the location of the interfered station, and
the processor is configured to receive information indicating an instruction for selecting the first interference calculation and the second interference calculation.

5. The interference evaluation apparatus according to claim 1, further comprising:
a diagram display configured to display, by way of a map or in a profile view, information indicating the interference calculation.

6. The interference evaluation apparatus according to claim 1,
wherein the interfering station is configured with a plurality of interfering stations,
the processor is configured to:
perform the interference calculation based on the interfering station information of the plurality of interfering stations and the interfered station information of the interfered station; and
determine whether the plurality of interfering stations and the interfered station are usable together.

7. An interference evaluation method for causing a processor to execute a process, the interference evaluation method comprising executing on the processor the steps of:
storing interfering station information and interfered station information into a storage medium, the interfering station information indicating a first usage frequency, a first bandwidth, and a first filter characteristic with respect to an interfering station causing radio interference in radio communication, the interfered station information indicating a second usage frequency, a second bandwidth, and a second filter characteristic with respect to an interfered station receiving the radio interference, performing an interference calculation for calculating an interference power based on the interfering station information and the interfered station information and in consideration of the first and second usage frequencies, the first and second bandwidths, and the first and second filter characteristics with respect to the interfering station and the interfered station, respectively; and determining whether the interfering station and the interfered station are usable together based on the calculated interference power and an acceptable interference power in the interfered station.

8. A non-transitory computer readable medium including a computer program for causing a computer to execute a process by a processor so as to perform the steps of:

store interfering station information and interfered station information into a storage medium, the interfering station information indicating a first usage frequency, a first bandwidth, and a first filter characteristic with respect to an interfering station causing radio interference in radio communication, the interfered station information indicating a second usage frequency, a second bandwidth, and a second filter characteristic with respect to an interfered station receiving the radio interference;

perform an interference calculation for calculating an interference power based on the interfering station information and the interfered station information and in consideration of the first and second usage frequencies, the first and second bandwidths, and the first and second filter characteristics with respect to the interfering station and the interfered station, respectively; and determine whether the interfering station and the interfered station are usable together based on the calculated interference power and an acceptable interference power in the interfered station.

9. The interference evaluation method according to claim 7, wherein the storage medium is further configured to store history information indicating a calculation condition used in a previously performed interference calculation, and the calculation condition includes an evaluation method for the radio interference and an execution condition of the interference calculation, and the processor is configured to perform the interference calculation based on the history information.

10. The interference evaluation method according to claim 7, further comprising:

generating a list of the interfering station information and the interfered station information;

receiving information indicating an instruction for selecting at least one of the interfering station information and the interfered station information used in the interference calculation from the list; and receiving information indicating an instruction for narrowing the list based on a designated range of a center frequency or a frequency band.

11. The interference evaluation method according to claim 7, wherein the interference calculation includes a first interference calculation and a second interference calculation, the processor is configured to perform the first interference calculation by using at least one of information indicating a location of the interfering station or information indicating a location of the interfered station, the processor is configured to perform the second interference calculation by not using the information indicating the location of the interfering station and the information indicating the location of the interfered station, and the processor is configured to receive information indicating an instruction for selecting the first interference calculation and the second interference calculation.

12. The interference evaluation method according to claim 7, further comprising:

displaying, by way of a map or in a profile view, information indicating the interference calculation.

13. The interference evaluation method according to claim 7, wherein the interfering station is configured with a plurality of interfering stations, and the processor is configured to:

perform the interference calculation based on the interfering station information of the plurality of interfering stations and the interfered station information of the interfered station; and determine whether the plurality of interfering stations and the interfered station are usable together.

14. The non-transitory computer readable medium according to claim 8, wherein the storage medium is further configured to store history information indicating a calculation condition used in a previously performed interference calculation, and the calculation condition includes an evaluation method for the radio interference and an execution condition of the interference calculation, and the processor is configured to perform the interference calculation based on the history information.

15. The non-transitory computer readable medium according to claim 8, wherein the processor is further configured to:

generate a list of the interfering station information and the interfered station information;

receive information indicating an instruction for selecting at least one of the interfering station information and the interfered station information used in the interference calculation from the list; and receive information indicating an instruction for narrowing the list based on a designated range of a center frequency or a frequency band.

16. The non-transitory computer readable medium according to claim 8, wherein the interference calculation includes a first interference calculation and a second interference calculation, the processor is configured to perform the first interference calculation by using at least one of information indicating a location of the interfering station or information indicating a location of the interfered station, the processor is configured to perform the second interference calculation by not using the information indicating the location of the interfering station and the information indicating the location of the interfered station, and the processor is configured to receive information indicating an instruction for selecting the first interference calculation and the second interference calculation.

17. The non-transitory computer readable medium according to claim 8,
wherein the processor is further configured to display, by way of a map or in a profile view, information indicating the interference calculation into a diagram display.

18. The non-transitory computer readable medium according to claim 8,
wherein the interfering station is configured with a plurality of interfering stations, and
the processor is configured to:
perform the interference calculation based on the interfering station information of the plurality of interfering stations and the interfered station information of the interfered station; and
determine whether the plurality of interfering stations and the interfered station are usable together.

\* \* \* \* \*